US012670090B2

(12) United States Patent
Gwak et al.

(10) Patent No.: US 12,670,090 B2
(45) Date of Patent: Jun. 30, 2026

(54) STORAGE DEVICE PROVIDING DIRECT MEMORY ACCESS, COMPUTING SYSTEM INCLUDING THE STORAGE DEVICE AND OPERATING METHOD OF THE STORAGE DEVICE

(71) Applicant: SAMSUNG ELECTRONICS CO., LTD., Suwon-si (KR)

(72) Inventors: Hyunho Gwak, Suwon-si (KR); Sangwon Jung, Suwon-si (KR); Jinsoo Yoo, Suwon-si (KR); Sihoon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 78 days.

(21) Appl. No.: 18/930,522

(22) Filed: Oct. 29, 2024

(65) Prior Publication Data

US 2025/0165384 A1 May 22, 2025

(30) Foreign Application Priority Data

Nov. 22, 2023 (KR) ........................ 10-2023-0163700

(51) Int. Cl.
*G06F 13/28* (2006.01)
*G06F 12/02* (2006.01)

(52) U.S. Cl.
CPC .......... *G06F 12/0223* (2013.01); *G06F 13/28* (2013.01); *G06F 2213/28* (2013.01)

(58) Field of Classification Search
None
See application file for complete search history.

(56) References Cited

U.S. PATENT DOCUMENTS 8,341,311 B1 * 12/2012 Szewerenko ........... G06F 13/28
710/52
8,601,347 B1 * 12/2013 Koseki ................ G06F 11/1048
714/764

(Continued)

FOREIGN PATENT DOCUMENTS

KR 10-2021-0016203 A 2/2021
KR 10-2484073 B1 1/2023
WO 2022/066179 A1 3/2022

*Primary Examiner* — Michael Sun
(74) *Attorney, Agent, or Firm* — Sughrue Mion, PLLC

(57) ABSTRACT

A storage device includes a memory controller, a buffer memory, and a memory device including a plurality of non-volatile memory devices connected to the memory controller via an identical channel. The memory controller is configured to generate a first command for performing a first DMA operation and a second command for performing a second DMA operation, adjust an output time interval between a first output time point of the first command with respect to a first non-volatile memory device among the plurality of non-volatile memory devices and a second output time point of the second command with respect to a second non-volatile memory device among the plurality of non-volatile memory devices, and is configured to add a time interval corresponding to the output time interval between an end time point of the first DMA operation corresponding to the first command and a start time point of the second DMA operation corresponding to the second command.

20 Claims, 20 Drawing Sheets

(56) References Cited

U.S. PATENT DOCUMENTS

| | | | | |
|---|---|---|---|---|
| 8,874,836 | B1 * | 10/2014 | Hayes | .................... G06F 3/0608 |
| | | | | 711/151 |
| 11,474,735 | B2 | 10/2022 | Jung et al. | |
| 2015/0081955 | A1 * | 3/2015 | Vucinic | .................... G06F 3/061 |
| | | | | 710/5 |
| 2021/0081106 | A1 | 3/2021 | Karia et al. | |
| 2021/0174883 | A1 | 6/2021 | Benisty | |
| 2021/0286550 | A1 | 9/2021 | Troy et al. | |
| 2022/0027055 | A1 | 1/2022 | Tanakamaru et al. | |
| 2022/0027084 | A1 | 1/2022 | Tanakamaru et al. | |
| 2022/0083275 | A1 | 3/2022 | Liu et al. | |
| 2022/0236876 | A1 | 7/2022 | Tanakamaru et al. | |
| 2022/0300442 | A1 * | 9/2022 | Jeon | .................... G06F 13/4295 |
| 2023/0161619 | A1 | 5/2023 | Kim et al. | |

* cited by examiner

| IO Delay Table | |
| --- | --- |
| NAND IO Count | tDelay |
| 0 | 0 us |
| 1 | 0 us |
| 2 | 20 us |
| 3 | 30 us |
| 4 | 40 us |
| ⋮ | ⋮ |

Static Delay

Dynamic Delay with IO Delay Table

STORAGE DEVICE PROVIDING DIRECT MEMORY ACCESS, COMPUTING SYSTEM INCLUDING THE STORAGE DEVICE AND OPERATING METHOD OF THE STORAGE DEVICE

CROSS-REFERENCE TO RELATED APPLICATION

This application is based on and claims priority to Korean Patent Application No. 10-2023-0163700, filed on Nov. 22, 2023 in the Korean Intellectual Property office, the disclosure of which is incorporated by reference herein in its entirety.

BACKGROUND

Apparatuses and methods consistent with embodiments of the present disclosure relate to a storage device, and more particularly, to a storage device providing host direct memory access and flash direct memory access.

Semiconductor memories are classified into volatile memory devices in which data stored therein is lost when a power supply is cut off, such as static random access memory (RAM) (SRAM), dynamic RAM (DRAM), and synchronous DRAM (SDRAM), and non-volatile memory devices in which data stored therein is maintained even when the power supply is cut off, such as read only memory (ROM), programmable ROM (PROM), electrically programmable ROM (EPROM), electrically erasable and programmable ROM (EEPROM), flash memory devices, phase-change (PRAM), resistive RAM (RRAM), ferroelectric RAM (FRAM).

Flash memory devices are widely used as mass storage media for computing systems. Recently, as computing technology develops, improved performance is required in flash memory-based mass storage media. Various techniques or devices have been developed to improve the performance of the flash memory-based mass storage media.

SUMMARY

Embodiments of the present disclosure provide a storage device having a direct memory access (DMA) function, and a storage device distributing DMA intervals.

According to an aspect of the present disclosure, a storage device may include a memory; and a memory device including a plurality of non-volatile memory devices connected to the memory controller via an identical channel, wherein each of the plurality of non-volatile memory devices includes a memory bank and a page buffer, wherein the memory controller includes a direct memory access (DMA) engine configured to perform a DMA operation of transferring data from the buffer memory to the plurality of non-volatile memory devices or transferring data from the plurality of non-volatile memory devices to the buffer memory, and wherein the memory controller is configured to: generate a first command for performing a first DMA operation and a second command for performing a second DMA operation; adjust an output time interval between a first output time point of the first command with respect to a first non-volatile memory device among the plurality of non-volatile memory devices and a second output time point of the second command with respect to a second non-volatile memory device among the plurality of non-volatile memory devices, and add a time interval corresponding to the output time interval between an end time point of the first DMA operation corresponding to the first command and a start time point of the second DMA operation corresponding to the second command.

An operating method of a storage device may include a plurality of non-volatile memory devices, the operating method including: generating a first command for performing a first DMA operation and a second command for performing a second DMA operation; adjusting an output time interval between a first output time point of the first command with respect to a first non-volatile memory device among the plurality of non-volatile memory devices connected to an identical channel and a second output time point of the second command with respect to a second non-volatile memory device among the plurality of non-volatile memory devices; and adding a time interval corresponding to the output time interval, between an end time point of the first DMA operation corresponding to the first command and a start time point of the second DMA operation corresponding to the second command.

A computing system may include: a host; and a storage device configured to store data according to a control by the host, wherein the storage device may include: a memory controller; a buffer memory; and a memory device including a plurality of non-volatile memory devices connected to the memory controller via an identical channel, wherein each of the plurality of non-volatile memory devices may include a memory bank and a page buffer, wherein the memory controller may include a direct memory access (DMA) engine configured to perform a DMA operation of transferring data from the buffer memory to the plurality of non-volatile memory devices or transferring data from the plurality of non-volatile memory devices to the buffer memory. The memory controller is further configured to: generate a first command for performing a first DMA operation and a second command for performing a second DMA operation; adjust an output time interval between a first output time point of the first command with respect to a first non-volatile memory device among the plurality of non-volatile memory devices and a second output time point of the second command with respect to a second non-volatile memory device among the plurality of non-volatile memory devices, and add a time interval corresponding to the output time interval between an end time point of the first DMA operation corresponding to the first command and a start time point of the second DMA operation corresponding to the second command.

BRIEF DESCRIPTION OF THE DRAWINGS

Embodiments will be more clearly understood from the following detailed description taken in conjunction with the accompanying drawings in which:

Figure 3A:
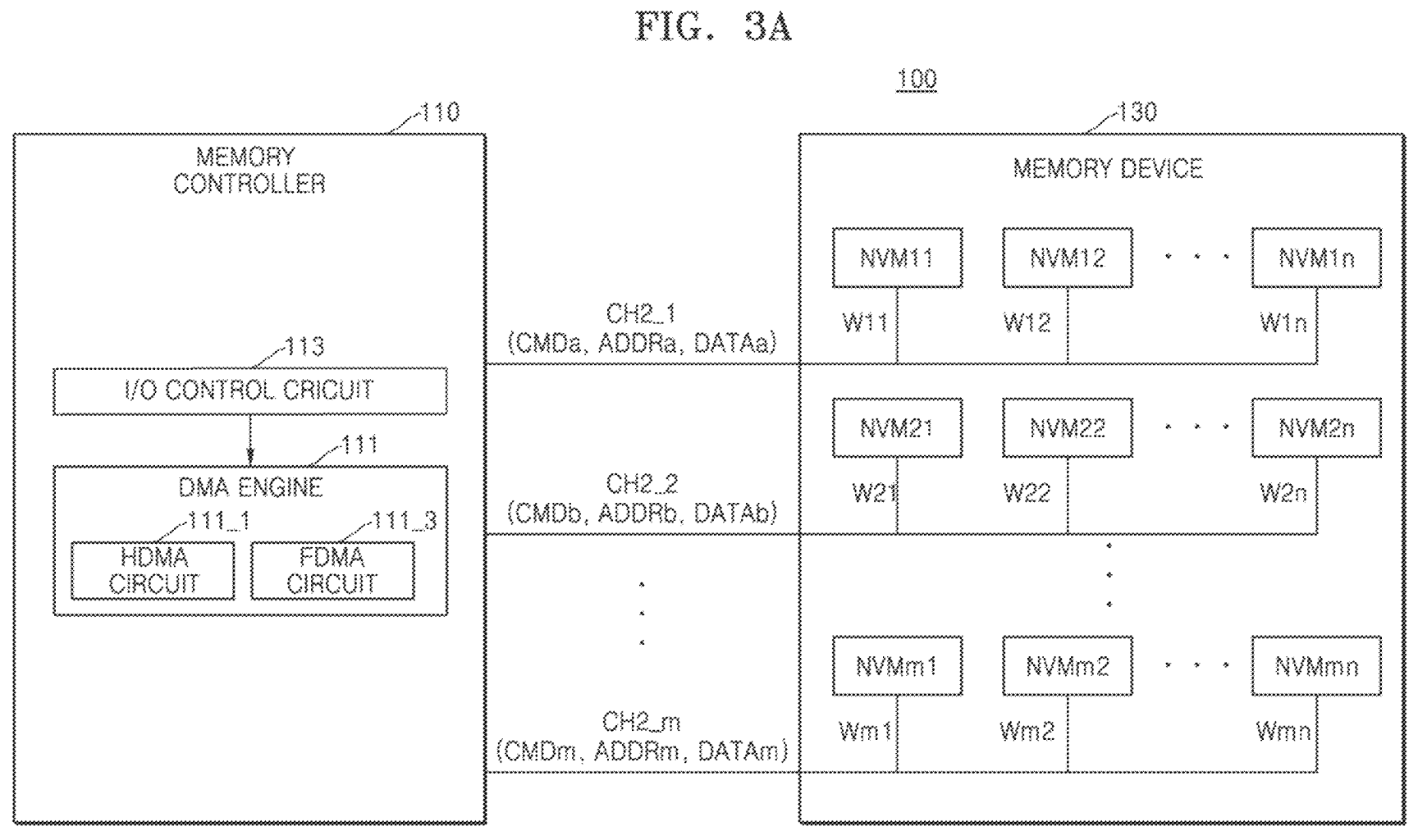

FIG. 3A is a block diagram of a storage device according to an embodiment.

FIG. 4A is a block diagram of a storage device according to an embodiment.

FIG. 6 illustrates an example of information stored in an IO delay table, according to an embodiment;

DETAILED DESCRIPTION OF THE EMBODIMENTS

Hereinafter, various embodiments of the inventive concept are described in conjunction with the accompanying drawings.

Figure 1:
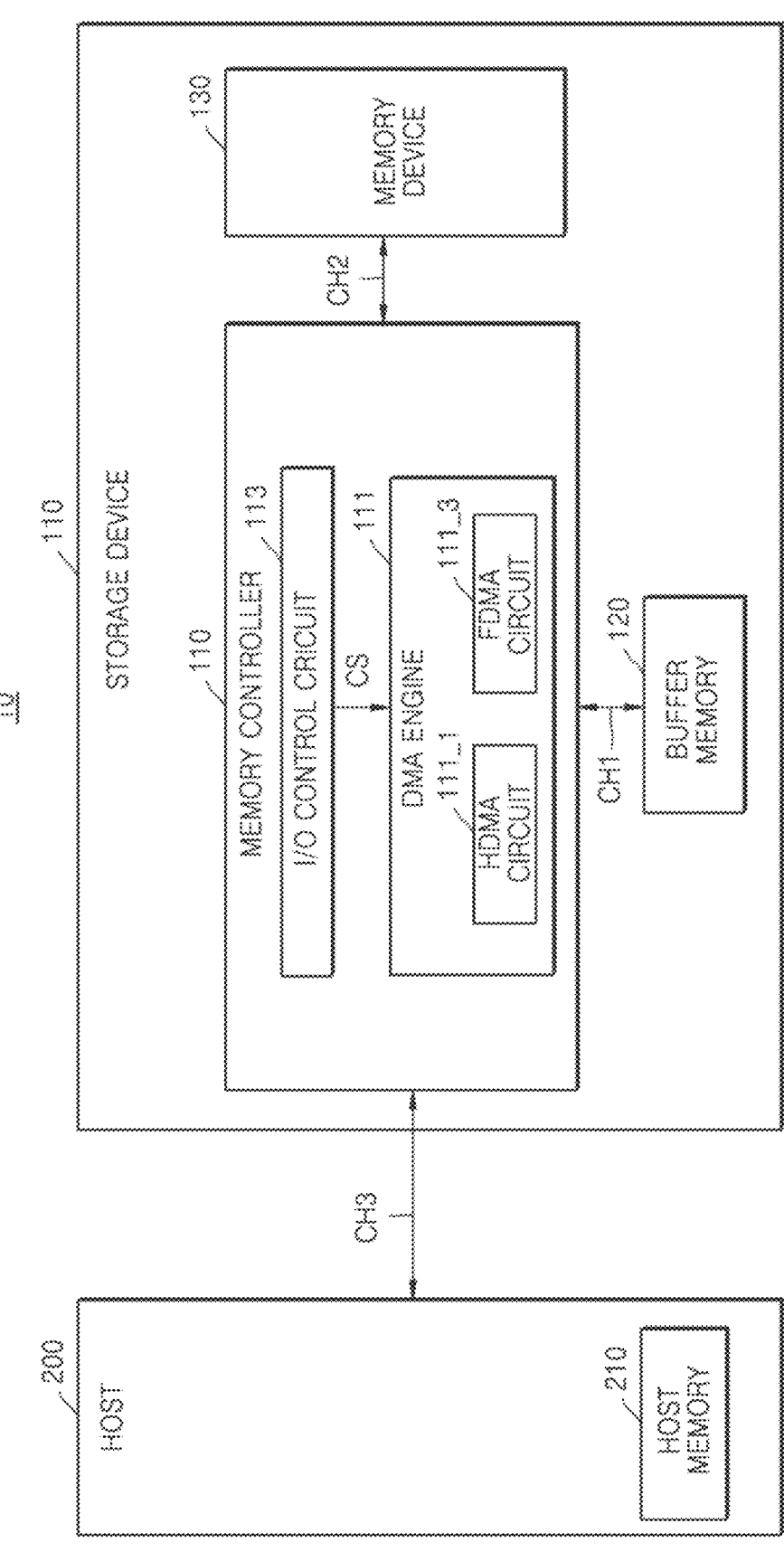
FIG. 1 is a block diagram of a computing system according to an embodiment.

FIG. 1 is a block diagram of a computing system 10 according to embodiments. FIGS. 2A through 2D are block diagrams of operations of a direct memory access (DMA) engine 111 according to embodiments. FIGS. 3A and 3B are a block diagrams of a storage device 100 according to embodiments.

FIG. 1 is a block diagram of the computing system 10 according to embodiments. Referring to FIG. 1, the computing system 10 may include a host 200 and a storage device 100. For example, the computing system 10 may include one or more of a computer, a mobile computer, an ultra mobile (UM) personal computer (PC) (UMPC), a workstation, a data server, a net-book, a personal digital assistant (PDA), a portable computer, a web tablet, a wireless phone, a mobile phone, a smartphone, a digital camera, a digital audio recorder, a digital audio player, a digital picture recorder, a digital picture player, a digital video recorder, a digital video recorder, a digital video player, a digital video player, a digital video player, a device capable of transceiving information in a wireless environment, and various electronic devices constituting a home network.

The host 200 may be configured to control the operation of the computing system 10. The host 200 may exchange information or data necessary to drive an operating system (OS) or a program with the storage device 100.

The storage device 100 may exchange data with the host 200 under the control by the host 200. For example, the storage device 100 may include a mass storage medium used in the computing system 10, such as a hard disk, a solid state drive (SSD), a memory card, an embedded memory card, and a memory stick.

The storage device 100 may include a memory controller 110, a buffer memory 120, and a memory device 130. For example, the memory controller 110 may include a DMA engine 111 and an input/output (I/O) control circuit 113. For example, each of the memory controller 110, the buffer memory 120, the memory device 130, the DMA engine 111, and the I/O control circuit 113 may be implemented as a separate semiconductor die, a chip, a package, or a module. Alternatively, some of the memory controller 110, the buffer memory 120, the memory device 130, the DMA engine 111, and the I/O control circuit 113 may be implemented as a separate semiconductor die, a chip, a package, or a module. For example, the DMA engine 111 and the I/O control circuit 113 may be implemented as one semiconductor die, one chip, one package, or one module.

The memory controller 110 may write data to the memory device 130 according to the control by the host 200, or may transfer data read from the memory device 130 to the host 200. Alternatively or additionally, the memory controller 110 may be configured to exchange data (e.g., flash translation layer (FTL), program code, mapping table, or the like) required for the operation of the storage device 100 with the memory device 130.

The buffer memory 120 may be configured to temporarily store write data received from the host 200 or data read from the memory device 130 as directed by the memory controller 110.

For example, a transmission channel CH3 between the host 200 and the memory controller 110 and the transmission channel CH2 between the memory controller 110 and the memory device 130 may have different bandwidths or different data transmission speeds from each other. To resolve the speed difference between the transmission channels CH3 and CH2, the buffer memory 120 may be configured to temporarily store write data or read data.

For example, the buffer memory 120 may include a high-speed random-access memory, such as static random-access memory (RAM) (SRAM), dynamic RAM (DRAM), and synchronous DRAM (SDRAM). Alternatively or additionally, the buffer memory 120 may include non-volatile memory devices, such as read only memory (ROM), programmable ROM (PROM), electrically programmable ROM (EPROM), electrically erasable and programmable ROM (EEPROM), flash memory devices, phase-change (PRAM), magnetic RAM (MRAM), resistive RAM (RRAM), ferroelectric RAM (FRAM), and thyristor RAM (TRAM). For example, the buffer memory 120 may include a dual-port memory. For example, the buffer memory 120 may temporarily store write data or read data provided by the 111 DMA engine 111.

The memory device 130 may be configured to store data or provide the stored data to the memory controller 110 under the control by the memory controller 110. For example, the memory device 130 may include non-volatile memory devices, such as ROM, PROM, EPROM, EEPROM, flash memory devices, PRAM, MRAM, RRAM, FRAM, and TRAM.

The DMA engine 111 according to the embodiment may include a host direct memory access (HDMA) circuit 111_1 and a flash direct memory access (FDMA) circuit 111_3. As an example, the HDMA circuit 111_1 and the FDMA circuit 111_3 may be implemented in a type of software, hardware, or a combination of software and hardware. In addition, in some embodiments, the DMA engine 111 may include an I/O control circuit 113.

The HDMA circuit 111_1 may be configured to control a DMA operation between the host 200 and the buffer memory 120. The FDMA circuit 111_3 may be configured to control the DMA operation between the memory device 130 and the buffer memory 120.

For example, the storage device 100 may operate in the DMA mode to improve a data transmission speed. The DMA mode may be referred to as an operation mode in which data is transferred under the control by the HDMA circuit 111_1 or the FDMA circuit 111_3 with or without intervention of a processor or a core included in the memory controller 110. In other words, data is transferred without necessitating the management or processing by the processor or core is not required, thereby facilitating a faster data transmission. In the DMA mode, the HDMA circuit 111_1 may control or govern data transfer between the host 200 and the buffer memory 120. The FDMA circuit 111_3 may control or govern data transfer between the memory device 130 and the buffer memory 120.

Hereinafter, descriptions are given with an assumption that the storage device 100 operates in the DMA mode.

As an example, when the memory controller 110 receives a read request from the host 200, the FDMA circuit 111_3 may read data (e.g., data corresponding to an address included in the read request) from the memory device 130 without the control of a processor or core, and may be configured to buffer or store the read data in the buffer memory 120. After the read data is buffered or stored in the buffer memory 120, the HDMA circuit 111_1 may read the data stored in the buffer memory 120 without control of a processor or core, and transfer the read data to the host 200. The read data may be stored in a host memory 210.

As an example, when the memory controller 110 receives a write request from the host 200, the HDMA circuit 111_1 may be configured to store write data provided from the host 200 (e.g., data corresponding to an address included in the write request) in the buffer memory 120 without control of a processor or core. The write data may be stored in the host memory 210. After the write data is stored in the buffer memory 120, the FDMA circuit 111_3 may be configured to read the write data stored in the buffer memory 120 without control of a processor or core, and transfer the write data to the memory device 130 memory device 130.

For example, when conducting internal operations of the storage device 100, such as garbage collection or read reclaim, which do not require involvement from the host 200, the FDMA circuit 111_3 may, without control of a processor or core, independently control data stored in the memory device 130 to be moved to the buffer memory 120, or data stored in the buffer memory 120 to be moved to the memory device 130.

The I/O control circuit 113 may output a command instructing an operation of the memory device 130 to the memory device 130.

As an example, in response to a command of the host 200, the I/O control circuit 113 may output a command instructing an operation of the memory device 130 to the memory device 130. For example, the command of the host 200 may include a write command or a read command. In addition, in response to the command of the host 200, the command of the I/O control circuit 113 output to the memory device 130 may include a write command or a read command.

As an example, when conducting internal operations of the storage device 100, such as garbage collection or read claim, which do not require involvement from the host 200, the I/O control circuit 113 may output a command for instructing an operation of the memory device 130 to the memory device 130. For example, in response to an internal operation of the storage device 100, the command of the I/O control circuit 113 output to the memory device 130 may include a write command or a read command.

In addition, while outputting a command instructing an operation of the memory device 130 to the memory device 130, the I/O control circuit 113 may output a control signal CS to the DMA engine 111.

In response to the control signal CS of the I/O control circuit 113, the DMA engine 111 may control to move data stored in the memory device 130 to the buffer memory 120, or move data stored in the buffer memory 120 to the memory device 130.

In other words, while outputting a command instructing an operation of the memory device 130 to the memory device 130, the I/O control circuit 113 may instruct the DMA engine 111 to copy data between the buffer memory 120 and the memory device 130.

Referring to FIGS. 2A, 2B, 2C, and 2D, operations of the DMA engine 111 and the I/O control circuit 113 are given in more details.

Referring to FIGS. 1, 2A, 2B, 2C, and 2D, the memory device 130 may further include a page buffer 131 page buffer 131 and a memory bank 133.

The page buffer 131 may operate as a write driver for the memory bank 133 or a sense amplifier for the memory bank 133 according to the operation mode.

The memory bank 133 may be implemented as a plurality of memory banks, and the memory bank 133 may be implemented as an arbitrary memory unit operable according to an individual command from the memory controller 110.

An operation of the DMA engine 111 on the memory device 130, that is, the DMA operation, may be divided into four operations according to whether the host 200 intervenes, and whether a command instructing the operation of the memory device 130 is a write command WRITE CMD or a read command READ CMD. In this case, whether the host 200 intervenes may indicate whether the command of the I/O control circuit 113 instructing the operation of the memory device 130 has been output in response to the command of the host 200.

Figure 2A:
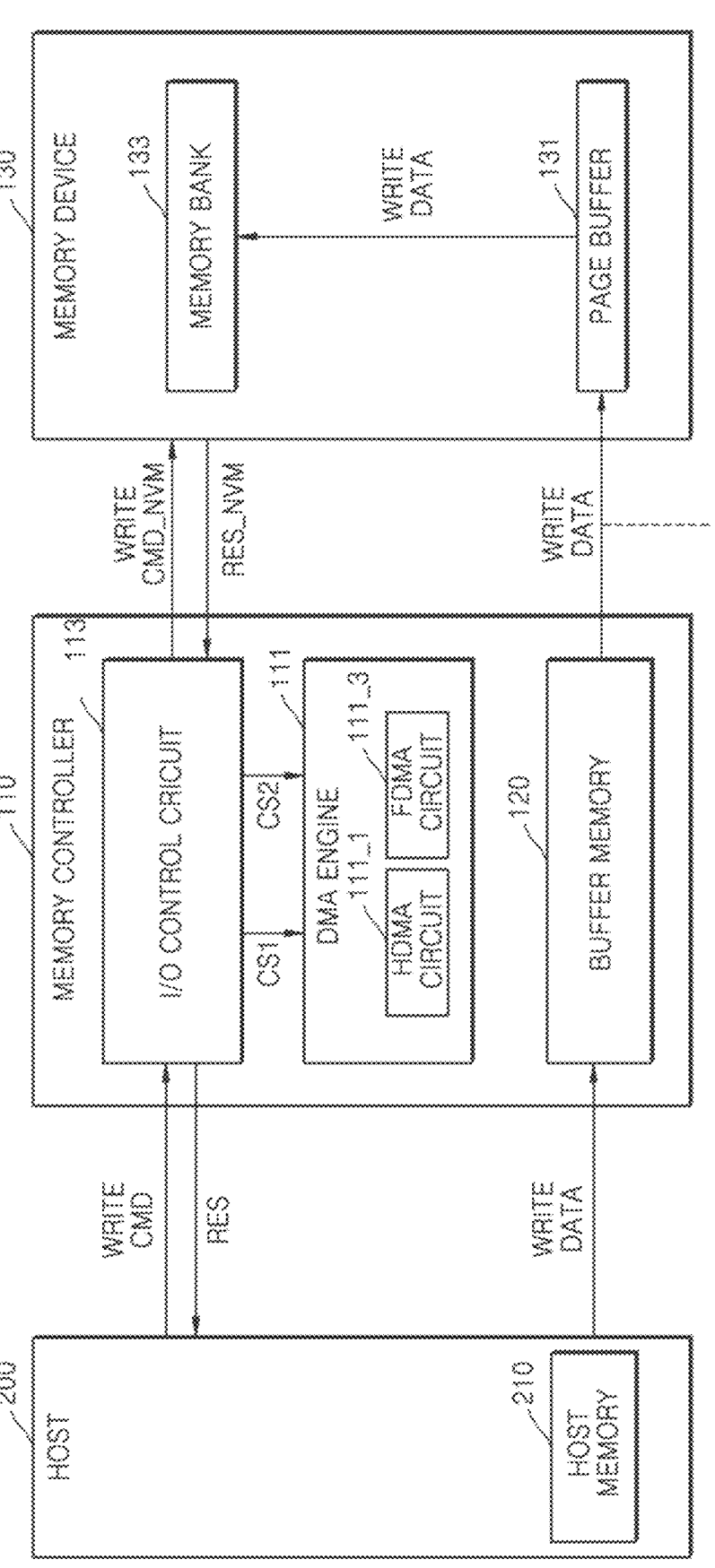
FIGS. 2A through 2D are block diagrams of operations of a direct memory access (DMA) engine according to embodiments.
Figure 2B:
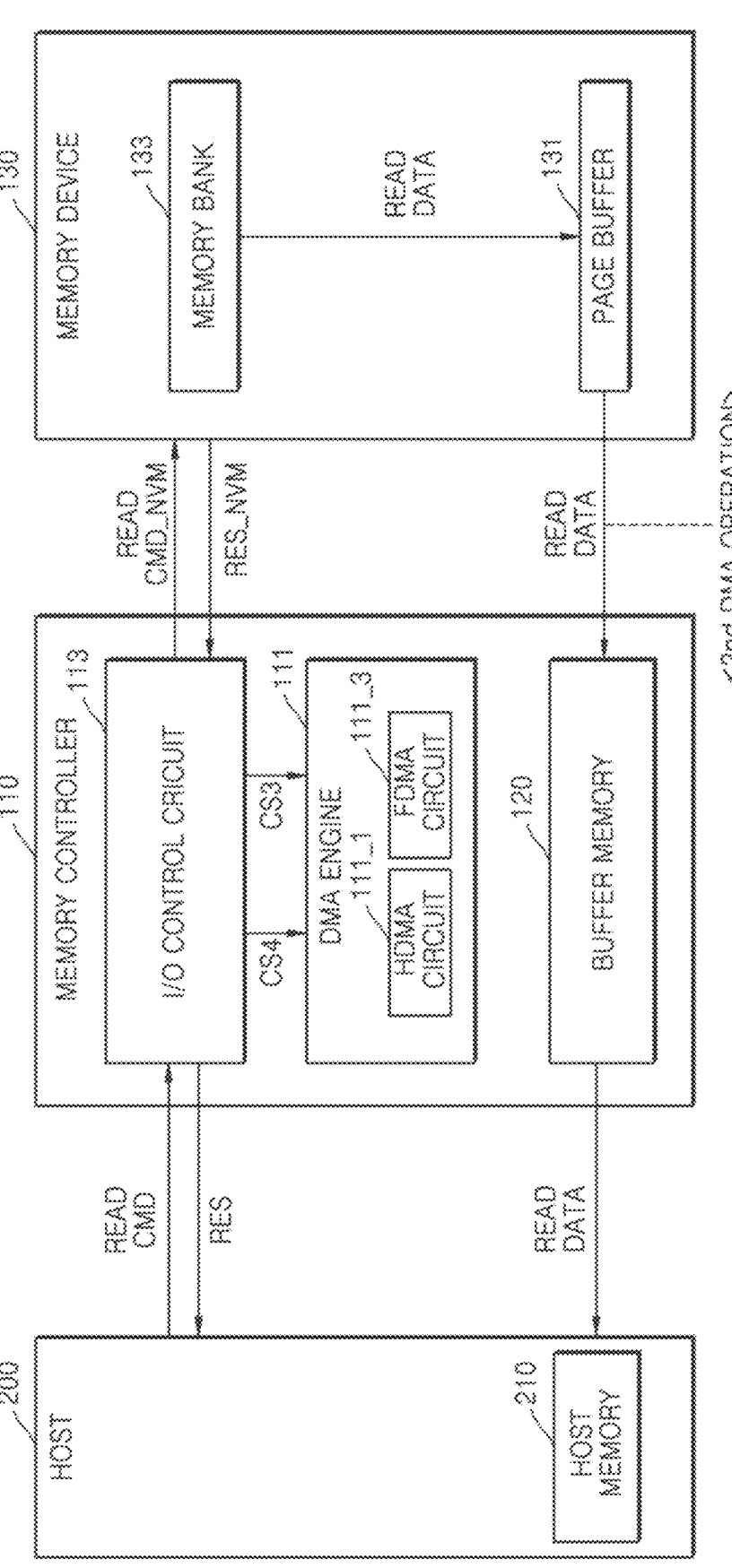
Figure 2C:
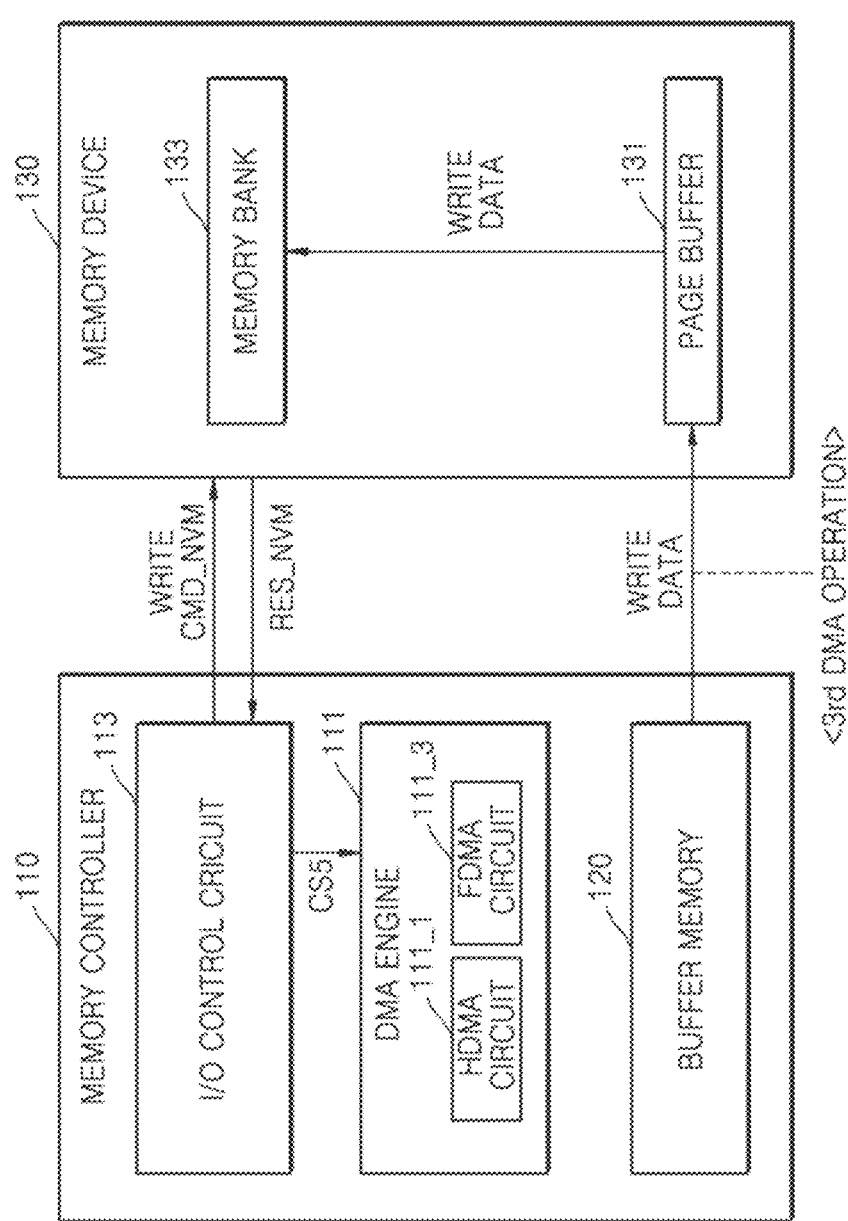
Figure 2D:
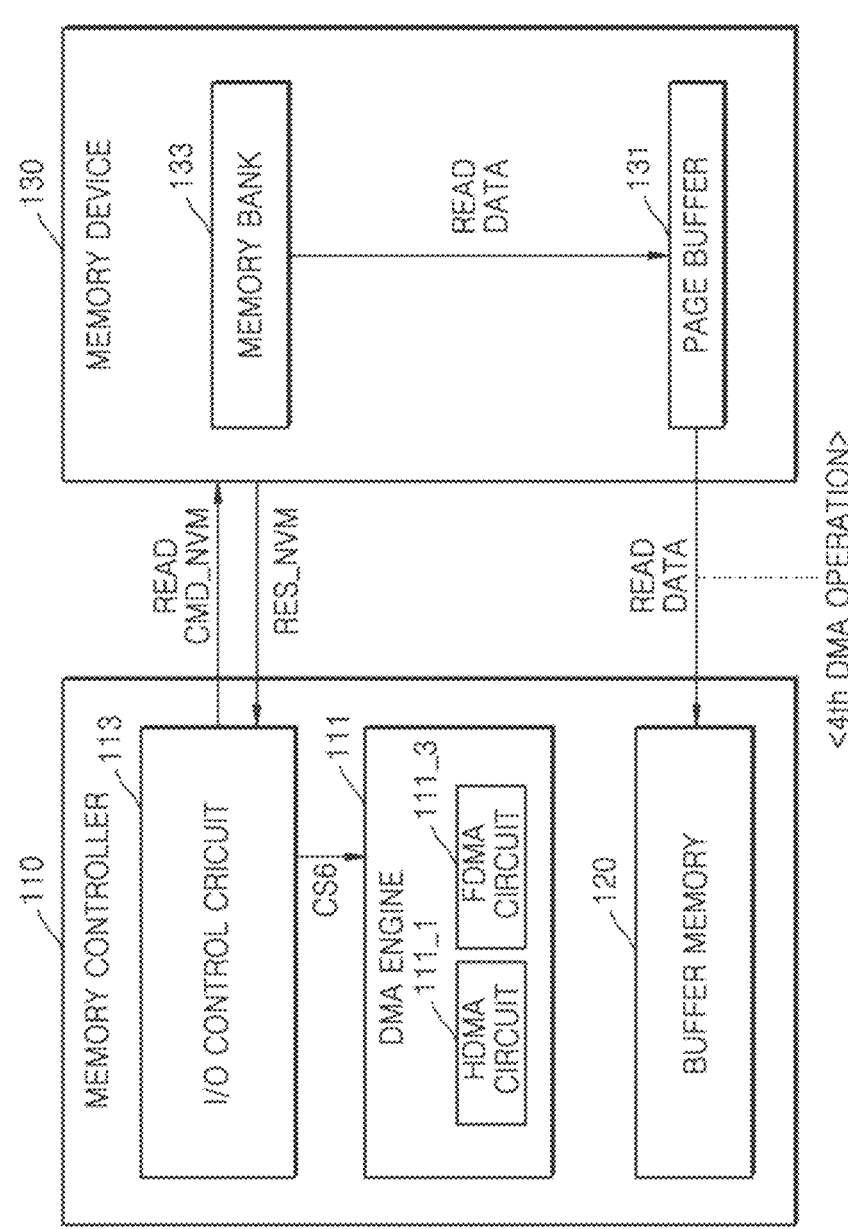
Figure 3B:
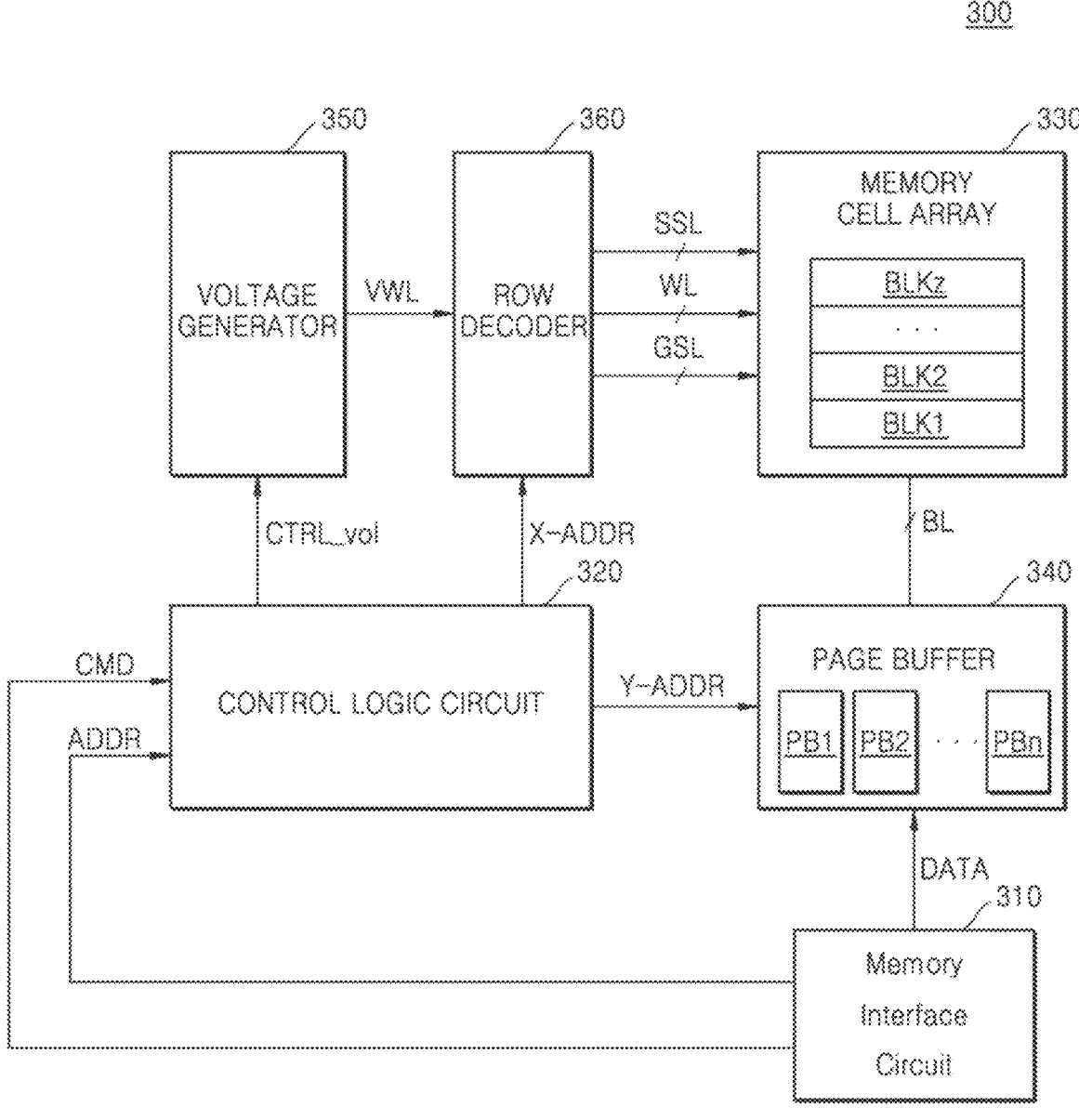
FIG. 3B is a block diagram of a non-volatile memory device according to an embodiment.

FIGS. 2A and 2B illustrate a case in which the I/O control circuit 113 outputs a command (WRITE CMD_NVM or READ CMD_NVM) in response to a command (WRITE CMD or READ CMD) of the host 200, and FIGS. 2C and 2D illustrate a case in which the I/O control circuit 113 outputs a command (WRITE CMD_NVM or READ CMD_NVM) for instructing an operation of the memory device 130 for an internal operation of the storage device 100 without intervention of the host 200.

Referring to FIG. 2A, when the I/O control circuit 113 receives the write command WRITE CMD from the host 200, the I/O control circuit 113 may output a first control signal CS1 based on the write command WRITE CMD to the DMA engine 111. The DMA engine 111 (for example, the HDMA circuit 111_1) may be configured to store the write data stored in the host memory 210 into the buffer memory 120 in response to the first control signal CS1.

Thereafter, the I/O control circuit 113 may, in response to the write command WRITE CMD of the host 200, output the command WRITE COMMAND_NVM instructing a write operation of the memory device 130 to the memory device 130. In this case, the I/O control circuit 113 may output, to the DMA engine 111, a second control signal CS2 based on the command WRITE CMD_NVM instructing a write operation of the memory device 130. The DMA engine 111 (e.g., the FDMA circuit 111_3) may be configured to provide the write data stored in the buffer memory 120 into the buffer memory 120 in response to the second control signal CS2.

Thereafter, the memory device 130 may be configured to, in response to the command WRITE CMD_NVM, store the write data stored in the page buffer 131 to the memory bank 133.

Thereafter, the I/O control circuit 113 may receive a response RES_NVM indicating write operation completion of the memory device 130, and output a response RES indicating write operation completion of the storage device 100 on the write data to the host 200.

In this case, an operation, in which, in response to the write command WRITE CMD of the host 200, the DMA engine 111 (e.g., the FDMA circuit 111_3) provides the write data stored in the buffer memory 120 to the page buffer 131 of the memory device 130, may be referred to as a first (1$^{st}$) DMA operation.

In other words, the 1$^{st}$ DMA operation on the memory device 130 may be referred to as data provision from the buffer memory 120 by the DMA engine 111 to the memory device 130 (for example, the page buffer 131) according to a write request of the host 200.

Referring to FIG. 2B, when the I/O control circuit 113 receives the read command READ CMD from the host 200, the I/O control circuit 113 may, in response to the read command READ CMD, output the command READ COM_NVM instructing a read operation of the memory device 130 to the memory device 130.

Thereafter, the memory device 130 may be configured to, in response to the command READ CMD_NVM, store the read data stored in the memory bank 133 to the page buffer 131.

Thereafter, the I/O control circuit 113 may receive the response RES_NVM indicating a read operation completion of the memory device 130. In this case, the I/O control circuit 113 may output a third control signal CS3 based on the response RES_NVM of memory device 130 to the DMA engine 111. The DMA engine 111 (e.g., the FDMA circuit 111_3) may be configured to store the read data stored in the page buffer 131 to the buffer memory 120 in response to the third control signal CS3.

Thereafter, the I/O control circuit 113 may receive the response RES_NVM indicating read operation completion of the memory device 130, and output a response RES indicating read operation completion of the storage device 100 on the read data to the host 200. In this case, the I/O control circuit 113 may output a fourth control signal CS4 based on the response RES indicating read operation completion to the DMA engine 111. The DMA engine 111 (e.g., the HDMA circuit 111_1) may be configured to, in response to the fourth control signal CS4, provide the read data stored in the buffer memory 120 to the host memory 210.

In this case, an operation in which the DMA engine 111 (e.g., the FDMA circuit 111_3) transfers read data from the page buffer 131 in the memory device 130 to the buffer memory 120 in response to the read command READ CMD, may be referred to as a second ($2^{nd}$) DMA operation with respect to the memory device 130.

In other words, the $2^{nd}$ DMA operation with respect to the memory device 130 may indicate data storage from the memory device 130 (e.g., the page buffer 131) by the DMA engine 111 according to a read request of the host 200 to the buffer memory 120.

Referring to FIG. 2C, to perform an internal operation of the storage device 100 such as garbage collection or read claim, without intervention of the host 200, the I/O control circuit 113 may output the command WRITE CMD_NVM instructing a write operation of the memory device 130. In this case, the I/O control circuit 113 may output, to the DMA engine 111, a fifth control signal CS5 based on the command WRITE CMD_NVM instructing a write operation of the memory device 130. The DMA engine 111 (e.g., the FDMA circuit 111_3) may be configured to provide the write data stored in the buffer memory 120 into the page buffer 131 in response to the fifth control signal CS5.

Thereafter, the memory device 130 may be configured to, in response to the command WRITE CMD_NVM, store the write data stored in the page buffer 131 to the memory bank 133.

Thereafter, the I/O control circuit 113 may receive the response RES_NVM indicating write operation completion of the memory device 130.

In this case, an operation in which the memory device 130 (e.g., the FDMA circuit 111_3) transfer write data from the buffer memory 120 to the page buffer 131 of the memory device 130 to perform an internal operation (garbage collection, read claim, or the like) of the storage device 100 without intervention of the host 200, may be referred to as a third ($3^{rd}$) DMA operation with respect to the memory device 130.

In other words, the $3^{rd}$ DMA operation on the memory device 130 may be referred to as data provision from the buffer memory 120 by the DMA engine 111 to the memory device 130 (e.g., the page buffer 131) according to an internal operation of the storage device 100.

Referring to FIG. 2D, to perform an internal operation (garbage collection, read claim, or the like) of the storage device 100 without intervention of the host 200, the I/O control circuit 113 may output the command READ CMD_NVM instructing a read operation of the memory device 130.

Thereafter, the memory device 130 may be configured to, in response to the command READ CMD_NVM, store the read data stored in the memory bank 133 to the page buffer 131.

Thereafter, the I/O control circuit 113 may receive the response RES_NVM indicating read operation completion of the memory device 130. In this case, the I/O control circuit 113 may output a sixth control signal CS6 based on the response RES_NVM of memory device 130 to the DMA engine 111. The DMA engine 111 (e.g., the FDMA circuit 111_3) may be configured to store the read data stored in the page buffer 131 to the buffer memory 120 in response to the sixth control signal CS6.

In this case, an operation, in which the DMA engine 111 (e.g., the FDMA circuit 111_3) provides the read data stored in the buffer memory 120 to the page buffer 131 of the memory device 130 to perform an internal operation (garbage collection, read claim, or the like) of the storage device 100 without intervention of the host 200, may be referred to as a fourth ($4^{th}$) DMA operation with respect to the memory device 130.

In other words, the $4^{th}$ DMA operation with respect to the memory device 130 may indicate data storage from the memory device 130 (e.g., the page buffer 131) by the DMA engine 111 according to an internal operation of the storage device 100 to the buffer memory 120.

Hereinafter, the $1^{st}$ through $4^{th}$ DMA operations with respect to the memory device 130 (or the page buffer 131) may be understood as the first through fourth DMA operations described above.

On the other hand, the transmission channel CH2 between the memory controller 110 and the memory device 130 may include a plurality of channels. Descriptions in more detail are given with reference to FIG. 3A.

Referring to FIGS. 1 and 3A, the storage device 100 may support first through $m^{th}$ channels CH2_1 through CH2_$m$, and the memory controller 110 and the memory device 130 may be connected to each other via the first through $m^{th}$ channels CH2_1 through CH2_$m$. In other words, the transmission channel CH2 between the memory controller 110 and the memory device 130 may include the first through $m^{th}$ channels CH2_1 through CH2_$m$.

The memory device 130 may include a plurality of non-volatile memory devices NVM11 through NVMmn. Each of the plurality of non-volatile memory devices NVM11 through NVMmn may be connected to one of the first through $m^{th}$ channels CH1 through CHm via a corresponding way. For example, the plurality of non-volatile memory devices NVM11 through NVM1$n$ may be connected to a first channel CH2_1 via ways W11 through W1$n$, and a plurality of non-volatile memory devices NVM21 through NVM2$n$ may be connected to a second channel CH2_2 via ways W21 through W2n. In an example embodiment, each of the plurality of non-volatile memory devices NVM11 through NVMmn may be implemented in arbitrary memory units capable of operating according to an individual command from the memory controller 110. For example, each of the plurality of non-volatile memory devices NVM11 through NVMmn may be implemented as a chip or die, but the embodiment is not limited thereto.

The memory controller 110 may transceive signals to and from the memory device 130 via the first through $m^{th}$ channels CH2_1 through CH2_m. For example, the memory controller 110 may transfer commands CMDa through CMDm, addresses ADDRa through ADDRm, and data DATAa through DATAm to the memory device 130 via the first through $m^{th}$ channels CH2_1 through CH2_m, respectively, and may receive data DATAa through DATAm from the memory device 130.

As an example, the DMA engine 111 may perform the first through fourth DMA operations on the memory device 130 via the first through $m^{th}$ channels CH2_1 through CH2_m. The DMA engine 111 may perform the first through fourth DMA operations on each of the plurality of non-volatile memory devices NVM11 through NVMmn included in the memory device 130 via the first through $m^{th}$ channels CH2_1 through CH2_m, respectively. In this case, each of the plurality of non-volatile memory devices NVM11 through NVMmn may include the page buffer 131 and the memory bank 133 described with reference to FIGS. 1 through 2D.

The memory controller 110 may select one of non-volatile memory devices connected to a corresponding channel via each channel, and transceive signals to and from the selected non-volatile memory device. For example, the memory controller 110 may select the memory device NVM11 from among the plurality of non-volatile memory devices NVM11 through NVM1n connected to the first channel CH2_1. The memory controller 110 may transfer a command CMDa, an address ADDRa, and data DATAa to the selected non-volatile memory device NVM11 via the first channel CH2_1, or may receive the data DATAa from the selected non-volatile memory device NVM11.

For example, the memory controller 110 may select one of the non-volatile memory devices connected to a channel via each channel, and the DMA engine 111 may perform first through fourth DMA operations on a page buffer included in the selected non-volatile memory device.

The memory controller 110 may control the overall operation of the memory device 130. The memory controller 110 may control each of the plurality of non-volatile memory devices NVM11 through NVM1n respectively connected to the first through $m^{th}$ channels CH2_1 through CH2_m by transmitting signals to the first through $m^{th}$ channels CH2_1 through CH2_m. For example, the memory controller 110 may control one selected from among the plurality of non-volatile memory devices NVM11 through NVM1n by transferring the command CMDa and the address ADDRa to the first channel CH2_1.

As an example, the I/O control circuit 113 may control one selected from among the plurality of non-volatile memory devices NVM11 through NVM1n by transferring the command CMDa to the first channel CH2_1.

Each of the plurality of non-volatile memory devices NVM11 through NVMmn may operate according to the control by the memory controller 110. For example, the non-volatile memory device NVM11 may write the data DATAa according to the command CMDa, the address ADDRa, and the data DATAa that are provided to the first channel CH2_1.

In other words, the memory device NVM11 may program data DATAa in the memory area corresponding to address ADDRa, according to command CMDa. For example, a non-volatile memory device NVM21 may read data DATAb according to a command CMDb and an address ADDRb that are provided via the second channel CH2_2, and may transfer the read data DATAb to the memory controller 110.

As an example, the non-volatile memory device NVM11 may write the data DATAa according to the command CMDa provided by the I/O control circuit 113 via the first channel CH2_1 and the data DATAa provided by the DMA engine 111 via the first channel CH2_1. In addition, the non-volatile memory device NVM21 may read the data DATAb according to the command CMDb provided by the I/O control circuit 113 via the second channel CH2_2, and may transfer the data DATAb read by using the DMA engine 111 to the memory controller 110.

In FIG. 3A, it is illustrated that the memory device 130 communicates with the memory controller 110 via m channels, and the memory device 130 includes n non-volatile memory devices corresponding to each of the m channels, the number of channels and the number of non-volatile memory devices connected to one channel may be variously changed.

On the other hand, the memory controller 110 may transceive signals to and from the memory device 130 in parallel via different channels from each other. For example, while the memory controller 110 transfers the command CMDa to the memory device 130 via the first channel CH2_1, the memory controller 110 may transfer the command CMDb to the memory device 130 via the second channel CH2_2. For example, while receiving the data DATAa from the memory device 130 via the first channel CH2_1, the memory controller 110 may receive the data DATAb from the memory device 130 via the second channel CH2_2. Multiple operations may be simultaneously performed in parallel through multiple channels CH2_1, CH2_2, . . . , CH2_m.

In addition, the DMA engine 111 may sequentially perform the DMA operations on non-volatile memory devices connected to one channel. In this case, the DMA operation may be referred to as one among the first through fourth DMA operations. For example, the DMA engine 111 may provide first data to a first page buffer corresponding to the first non-volatile memory device NVM11 via the first channel CH2_1, and thereafter, the DMA engine 111 may provide second data to a second page buffer corresponding to the non-volatile memory device NVM12 via the first channel CH2_1.

In some embodiments, the DMA engine 111 may not simultaneously perform the DMA operations on non-volatile memory devices connected to one channel. In this case, the DMA operation may be referred to as one among the first through fourth DMA operations. For example, while the DMA engine 111 provides the first data to the first page buffer corresponding to the non-volatile memory device NVM11 via the first channel CH2_1, the DMA engine 111 may provide the second data to the second page buffer corresponding to the non-volatile memory device NVM12 via the first channel CH2_1. This issue is described in detail with reference to FIGS. 4A through 4G.

FIG. 3B is an example block diagram of a non-volatile memory device 300 according to an embodiment. The non-volatile memory device 300 may correspond to one non-volatile memory device among the plurality of non-volatile memory devices NVM11 through NVM1n described with reference to FIG. 3A. Hereinafter, descriptions are given with reference to FIGS. 1 through 3A, and duplicate descriptions thereof are omitted.

Referring to FIG. 3B, the non-volatile memory device 300 may include a control logic circuit 320, a memory cell array 330, a page buffer 340, a voltage generator 350, and a row decoder 360. Although not illustrated in FIG. 3B, the non-volatile memory device 300 may further include a memory interface circuit 310 illustrated in FIG. 3B, and may further include a column logic, a pre-decoder, a temperature sensor, a command decoder, an address decoder, etc.

The control logic circuit 320 may control various operations in the non-volatile memory device 300. The control logic circuit 320 may output various control signals in response to a command CMD and/or an address ADDR provided by the memory interface circuit 310. For example, the control logic circuit 320 may output a voltage control signal CTRL_vol, a row address X_ADDR, and a column address Y_ADDR.

The memory cell array 330 may include a plurality of memory blocks BLK1 through BLKz (z is a positive integer), and each of the plurality of memory blocks BLK1 through BLKz may include a plurality of memory cells. The memory cell array 330 may be connected to the page buffer 340 via bit lines BL, and may be connected to the row decoder 360 via word lines WL, string selection lines SSL, and ground selection lines GSL.

In the inventive concept, the memory cell array 330 and a memory bank may be used interchangeably.

In an example embodiment, the memory cell array 330 may include a three-dimensional memory cell array, and the three-dimensional memory cell array may include a plurality of NAND strings. Each NAND string may include memory cells respectively connected to the word lines WL vertically stacked on a substrate. In an example embodiment, the memory cell array 330 may include a two-dimensional memory cell array, and the two-dimensional memory cell array may include a plurality of NAND strings that are arranged in rows and columns.

The page buffer 340 may include a plurality of page buffers PB1 through PBp (p is an integer of 3 or more), and the plurality of page buffers PB1 through PBp may be connected to the memory cells via the plurality of bit lines BL. The page buffer 340 may select at least one bit line BL among the bit lines BL in response to the column address Y-ADDR. The page buffer 340 may operate as a write driver or a sense amplifier according to an operation mode. For example, during a program operation, the page buffer 340 may apply a bit line voltage corresponding to data to be programmed to the selected bit line BL. During a read operation, the page buffer 340 may sense data stored in the memory cell by sensing a current or voltage of the selected bit line BL.

The voltage generator 350 may generate various types of voltages for performing program, read, and erase operations based on the voltage control signal CTRL_vol. For example, the voltage generator 350 may, as a word line voltage VWL, generate a program voltage, a read voltage, a program verification voltage, an erase voltage, etc.

The row decoder 360 may select one of the plurality of word lines WL in response to the row address X-ADDR, and may select one of the plurality of string selection lines SSL. For example, during the program operation, the row decoder 360 may apply the program voltage and the program verification voltage to the selected word line WL, and may apply the read voltage to the selected word line WL during the read operation.

Figure 4A:
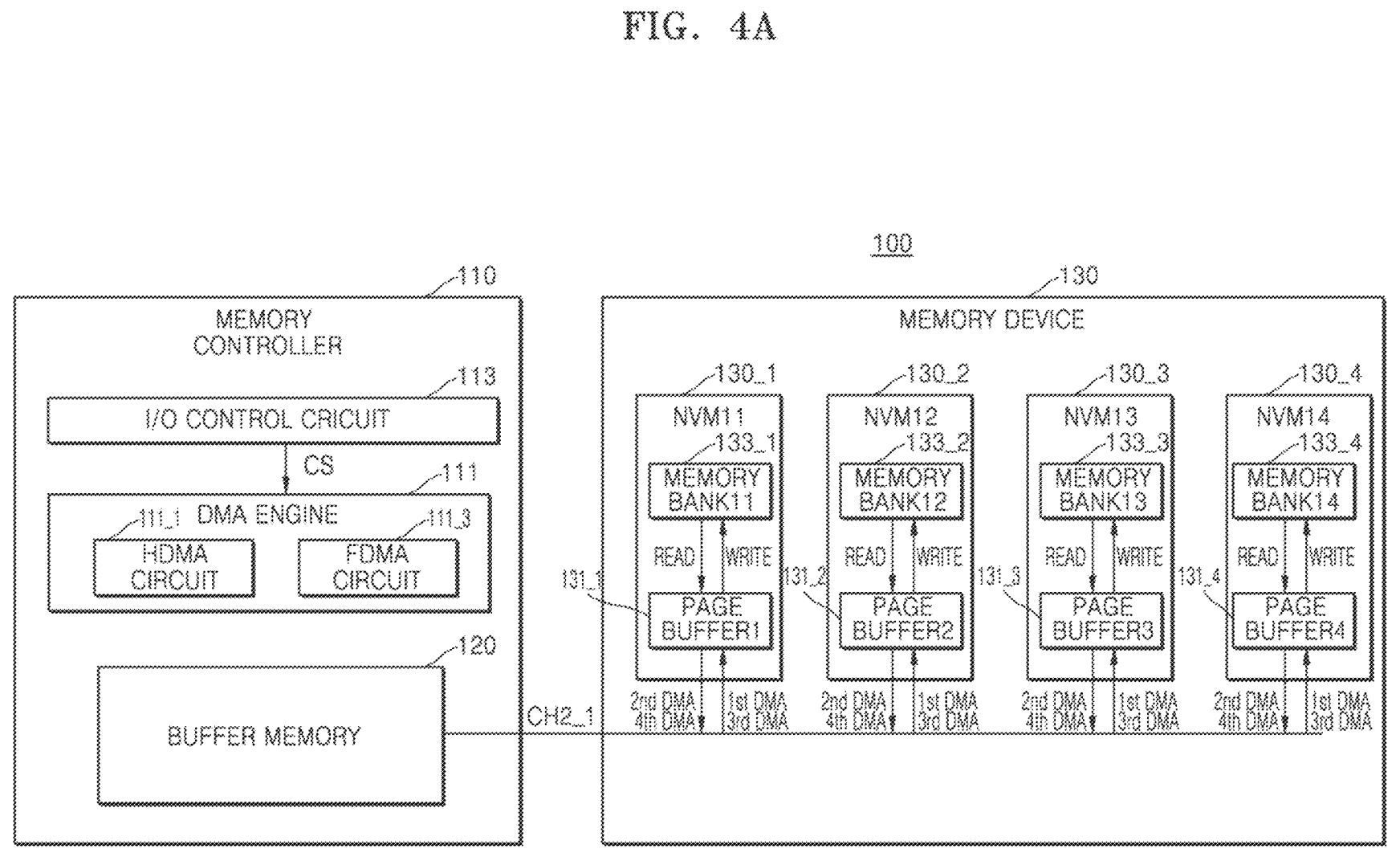
Figure 4B:
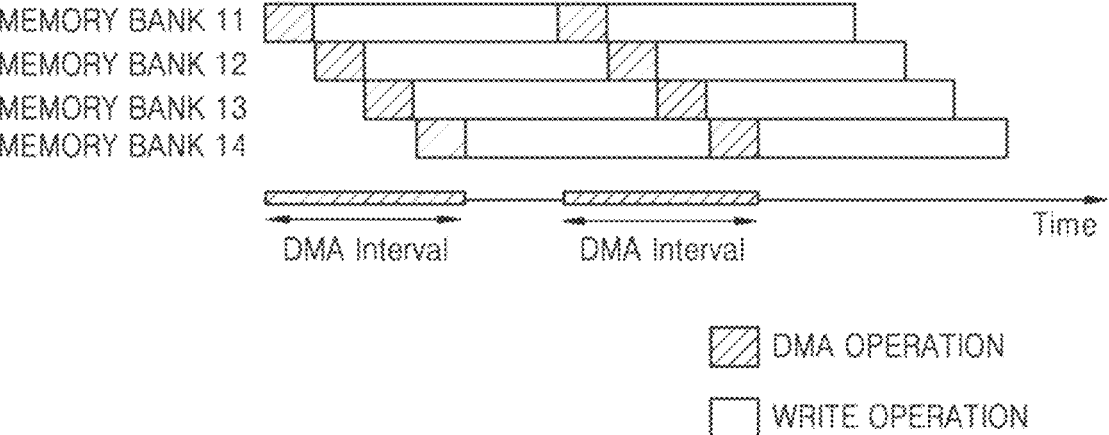
FIGS. 4B through 4F are diagrams of an operating method of a storage device according to embodiments.

FIG. 4A is a block diagram of a storage device 100 according to an embodiment, and FIGS. 4B through 4F are diagrams of an operating method of the storage device 100 according to embodiments. Hereinafter, descriptions are given with reference to FIGS. 1 through 3B, and duplicate descriptions thereof are omitted.

Referring to FIG. 4A, the memory device 130 may include first through fourth non-volatile memory devices 130_1 through 130_4 connected to the first channel CH2_1 illustrated in FIG. 3A, and each non-volatile memory device may include a memory bank and a page buffer. For convenience of description, although the first channel CH2_1 is illustrated as being connected to four non-volatile memory devices, the embodiment is not limited thereto.

The first non-volatile memory device (NVM11) 130_1 may include a first memory bank 133_1 and a first page buffer 131_1 corresponding to the first memory bank 133_1. The second non-volatile memory device 130_2 may include a second memory bank (NVM12) 133_2 and a second page buffer 131_2 corresponding to the second memory bank 133_2. The third non-volatile memory device (NVM13) 130_3 may include a third memory bank 133_3 and a third page buffer 131_3 corresponding to the third memory bank 133_3. The fourth non-volatile memory device (NVM14) 130_4 may include a fourth memory bank 133_4 and a fourth page buffer 131_4 corresponding to the fourth memory bank 133_4.

The DMA engine 111 may sequentially perform the first through fourth DMA operations described with reference to FIGS. 2A through 2D in the order instructed by the memory controller 110 with respect to non-volatile memory devices connected to one channel, and may not simultaneously perform the first through fourth DMA operations on non-volatile memory devices connected to one channel. In this case, the order instructed by the memory controller 110 may be determined by the I/O controller 113.

Referring to FIGS. 4A and 4B, on one memory bank, a DMA operation (e.g., the first DMA operation or the third DMA operation) of providing data to a corresponding page buffer from the buffer memory 120 and a write operation, in which data is written from a corresponding page buffer to a corresponding memory bank, may be sequentially performed. For example, by the DMA engine 111, the DMA operation (e.g., the first DMA operation or the third DMA operation), in which data stored in the buffer memory 120 is provided to the first page buffer 131_1 corresponding to the first memory bank 133_1 may be performed, and data stored in the first page buffer 131_1 may be sequentially written in the first memory bank 133_1 by the memory device 130.

In other words, one unit of a write operation on one memory bank may include a first operation of copying data from the buffer memory 120 to a corresponding page buffer by the DMA engine 111, and a second operation in which data copied to the page buffer is written to the corresponding memory bank by the memory device 130.

In addition, because the DMA engine 111 may not simultaneously perform the DMA operation (e.g., the first DMA operation or the third DMA operation) on the first through fourth non-volatile memory devices 130_1 through 130_4 connected to the same channel, the DMA engine 111 may perform the DMA operation (e.g., the first DMA operation or the third DMA operation) on only one of the first through fourth non-volatile memory devices 130_1 through 130_4 during a DMA interval.

In other words, during the DMA interval, the DMA engine 111 may provide data stored in the buffer memory 120 only to a page buffer corresponding to one memory device among the plurality of non-volatile memory devices connected to the same channel.

Accordingly, the DMA engine 111 may complete the DMA operation (e.g., the first DMA operation or the third DMA operation) on one non-volatile memory device, and then, perform the DMA operation (e.g., the first DMA operation or the third DMA operation) on the next non-volatile memory device. Referring to FIG. 4B, it may be understood that the DMA engine 111 completes the DMA operation on the first non-volatile memory device 130_1 (e.g., the first page buffer 131_1) including the first memory bank 133_1, and then, starts the DMA operation on the second non-volatile memory device 130_2 including the second memory bank 133_2 (e.g., the second page buffer 131_2).

Figure 4C:
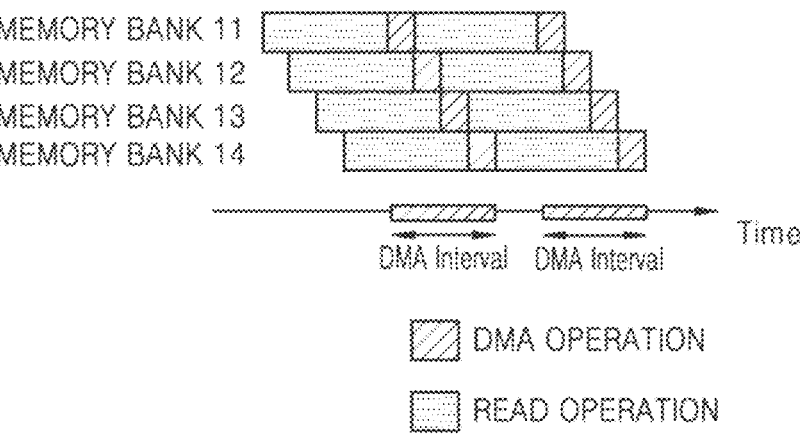

Referring to FIGS. 4A and 4C, on one memory bank, a read operation, in which data is read from a corresponding memory bank to a corresponding page buffer, and the DMA operation (e.g., the second DMA operation or the fourth DMA operation) of storing data stored in the corresponding page buffer in the buffer memory 120 may be sequentially performed. For example, by the memory device 130, data stored in the first memory bank 133_1 to the first page buffer 131_1, and the DMA operation (e.g., the second DMA operation or the fourth DMA operation) may be performed, in which data stored in the first page buffer 131_1 corresponding to the first memory bank 133_1 is sequentially stored in the buffer memory 120 by the DMA engine 111.

In other words, one unit of a read operation on one memory bank may include a first operation of reading data stored in a corresponding memory bank to a corresponding page buffer by the memory device 130, and thereafter, a second operation in which data read from a corresponding page buffer is stored in the buffer memory 120 by the DMA engine 111.

In addition, because the DMA engine 111 may not simultaneously perform the DMA operation (e.g., the second DMA operation or the fourth DMA operation) on the first through fourth non-volatile memory devices 130_1 through 130_4 connected to the same channel, the DMA engine 111 may perform the DMA operation (e.g., the second DMA operation or the fourth DMA operation) on only one non-volatile memory device among the first through fourth non-volatile memory devices 130_1 through 130_4 connected to the same channel during the DMA interval.

In other words, throughout the DMA interval, the DMA engine 111 may be restricted to transferring data from the buffer memory 120 only to a page buffer corresponding to one memory device among the plurality of non-volatile memory devices connected to the same channel.

Accordingly, the DMA engine 111 may complete the DMA operation (e.g., the second DMA operation or the fourth DMA operation) on one non-volatile memory device, and then, perform the DMA operation (e.g., the second DMA operation or the fourth DMA operation) on the next non-volatile memory device. Referring to FIG. 4B, it may be understood that the DMA engine 111 completes the DMA operation on the first non-volatile memory device 130_1 including the first memory bank 133_1, and then, starts the DMA operation (e.g., the second DMA operation or the fourth DMA operation) on the second non-volatile memory device 130_2 including the second memory bank 133_2.

On the other hand, when the DMA operation is performed to process an existing command in one non-volatile memory device, the processing of a new command from the host 200 in the corresponding non-volatile memory device may be significantly delayed. This issue is described in detail with reference to FIG. 4D.

Figure 4D:
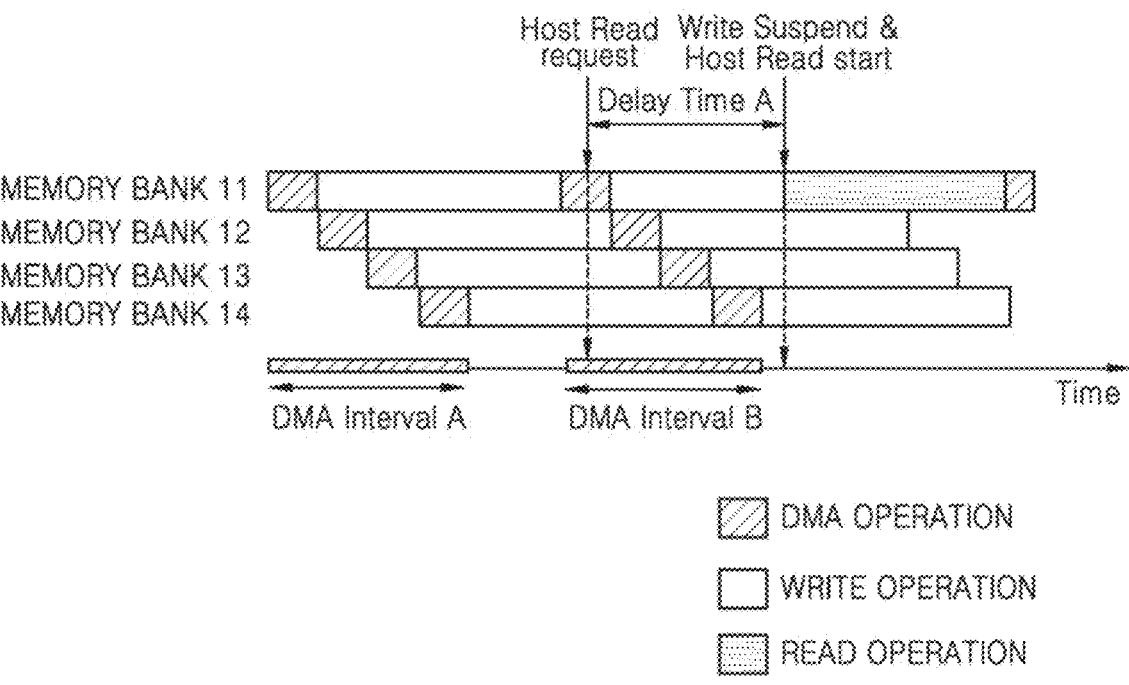

In FIG. 4D, when the DMA operation (e.g., the first DMA operation or the third DMA operation) for processing an existing write command WRITE CMD in the first non-volatile memory device 130_1 including the first memory bank 133_1 is performed, steps are illustrated in which a command of the I/O control circuit 113 based on a read request of the host 200 of the first memory bank 133_1 is processed in the memory device 130.

The DMA engine 111 may sequentially perform DMA operations on the existing command for memory banks of non-volatile memory devices connected to the same channel, and the DMA engine 111 may perform the DMA operation on a new command for memory banks of non-volatile memory devices connected to the same channel after the DMA operations on the existing command are completed.

In other words, because the DMA engine 111 may not perform the DMA operation on the new command in a DMA interval for the memory banks connected to the same channel, during the DMA interval for the memory banks connected to the same channel, the memory device 130 may not process a new command on the memory banks connected to the same channel.

Referring to FIG. 4D, during the DMA interval (e.g., a DMA interval B), the DMA engine 111 may perform the DMA operation (e.g., the first DMA operation or the third DMA operation) on the first through fourth memory banks 133_1 through 133_4. The memory device 130 may, after the DMA operation on the fourth memory bank 133_4 is completed, stop a write operation based on the existing write command WRITE CMD on the first memory bank 133_1, and start a read operation on the first memory bank 133_1 based on a new read command READ CMD.

In other words, although the memory device 130 receives a new command of the I/O control circuit 113 based on a new host read command with respect to the first memory bank 133_1, the memory device 130 may process a new command for the first memory bank 133_1 after the DMA operation on the fourth memory bank 133_4 is completed, and thus, a significant delay time A may occur in processing a new host read command.

On the other hand, according to the embodiment, the I/O control circuit 113 may reduce the delay time A that may occur in the processing of a new Host Read request by distributing a DMA interval. This issue is described in detail with reference to FIGS. 4E and 4F.

In embodiments of the present disclosure, memory banks connected to one channel may be referred to as memory banks of non-volatile memory devices connected to one channel. In addition, a DMA operation on one memory bank may be referred to as a DMA operation on a page buffer of a non-volatile memory device including the corresponding memory bank.

The I/O control circuit 113 may adjust an output time interval between commands instructing an operation of each of the non-volatile memory devices including a plurality of memory banks connected to the same channel.

For example, the I/O control circuit 113 may adjust an output time interval between a first output time point of a first command for a first non-volatile memory device among a plurality of non-volatile memory devices connected to the same channel, and a second output time point of a second command for a second non-volatile memory device among the plurality of non-volatile memory devices connected to the same channel.

As the I/O control circuit 113 adjusts the output time interval between the commands, the DMA interval of the plurality of memory banks connected to one channel may be distributed.

For example, the I/O control circuit 113 may adjust an output time interval between the first command instructing an operation of a non-volatile memory device of the first memory bank 133_1 and the second command instructing an operation of the memory device 130 with respect to the second memory bank 133_2 connected to the same channel as the first memory bank 133_1. In this manner, an end time point of the DMA operation on the first memory bank 133_1 may be different from a start time point of the DMA operation on the second memory bank 133_2 by a time interval corresponding to an adjusted output time point. In other words, as the DMA interval of the first memory bank 133_1 and the DMA interval of the second memory bank 133_2 are apart from each other by a time interval corresponding to an adjusted output time interval, the DMA interval for the first memory bank 133_1 and the second memory bank 133_2, which are connected to one channel, may be distributed.

Figure 4E:
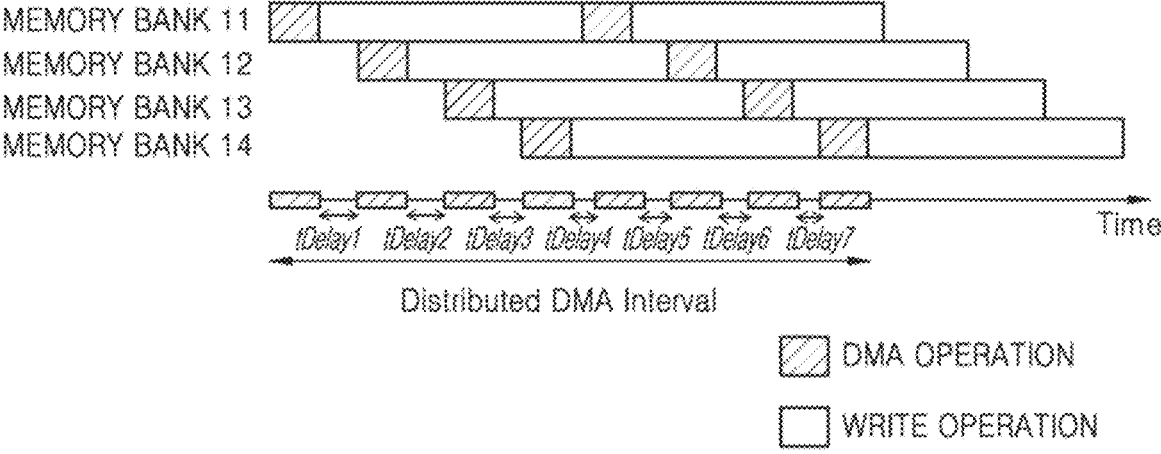

Referring to FIG. 4E, it may be understood that, based on first through eighth write commands of the I/O control circuit 113, the DMA operation (e.g., the first DMA operation or the third DMA operation) and a write operation of a non-volatile memory device including a corresponding memory bank is performed on the first through fourth memory banks 133_1 through 133_4.

Referring to FIG. 4E, the I/O control circuit 113 may output, to the memory device 130, the first through eighth write commands in which the output time interval has been adjusted by adding output time intervals tDelay1, tDelay2, tDelay3, tDelay4, tDelay5, tDelay6, and tDelay7.

In this manner, the distributed DMA interval may be formed based on the output time intervals tDelay1, tDelay2, tDelay3, tDelay4, tDelay5, tDelay6, and tDelay7.

The I/O control circuit 113 may output, to the memory device 130, a second write command for the second memory bank 133_2 having the output time interval tDelay1 delayed than a first write command for the first memory bank 133_1. In addition, the I/O control circuit 113 may output, to the memory device 130, a third write command for the third memory bank 133_3 having the output time interval tDelay2 delayed than the second write command for the second memory bank 133_2.

In addition, the output time intervals tDelay1, tDelay2, tDelay3, tDelay4, tDelay5, tDelay6, and tDelay7 may be determined according to various embodiments. This issue is described in detail with reference to other diagrams.

For example, the output time intervals tDelay1, tDelay2, tDelay3, tDelay4, tDelay5, tDelay6, and tDelay7 may also be different from each other, or may also be the same as each other.

Figure 4F:
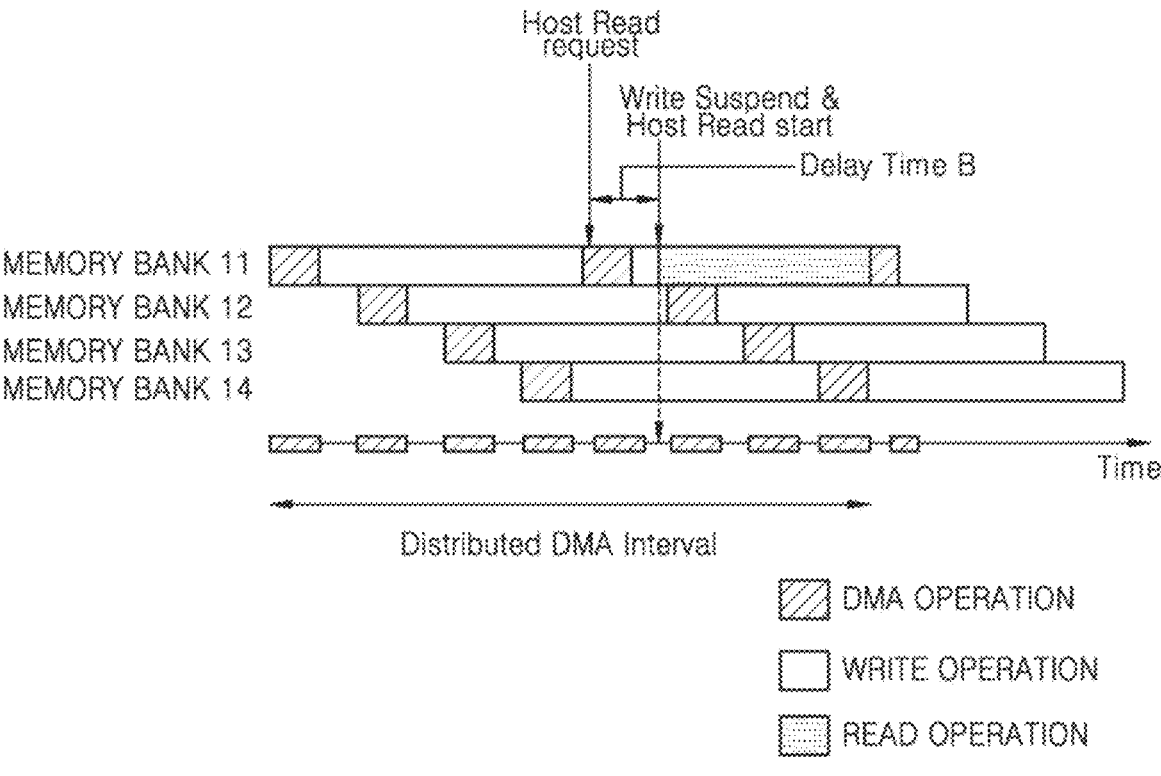

Referring to FIG. 4F, during the DMA interval, the DMA engine 111 may perform the DMA operation (e.g., the first DMA operation or the third DMA operation) on the first through fourth memory banks 133_1 through 133_4. The memory device 130 may, after the DMA operation on the first memory bank 133_1 is completed, stop a write operation based on the existing write command WRITE CMD on the first memory bank 133_1, and start a read operation on the first memory bank 133_1 based on a new read command READ CMD.

In FIG. 4D, the memory device 130 may start a read operation on the first memory bank 133_1 after the DMA operation on the fourth memory bank 133_4 is completed, but in FIG. 4F, the memory device 130 may start a read operation based on a new read command READ CMD for the first memory bank 133_1 after the DMA operation on the first memory bank 133_1 is completed.

In other words, in FIG. 4D, a significant amount of delay time A may occur for processing a new host read command, but in FIG. 4F, a reduced delay time B in processing of a new host read command may occur.

In this manner, according the embodiment, by distributing the DMA interval with respect to a plurality of memory banks connected to one channel by adjusting an output time interval between commands instructing an operation of each of the plurality of memory banks connected to one channel, a delay time occurring in the process of a new host read command may be reduced.

In addition, according to the embodiment, by reducing a delay time occurring in the process of a new host read command, quality of service (QOS) requirements may be satisfied.

Figure 5A:
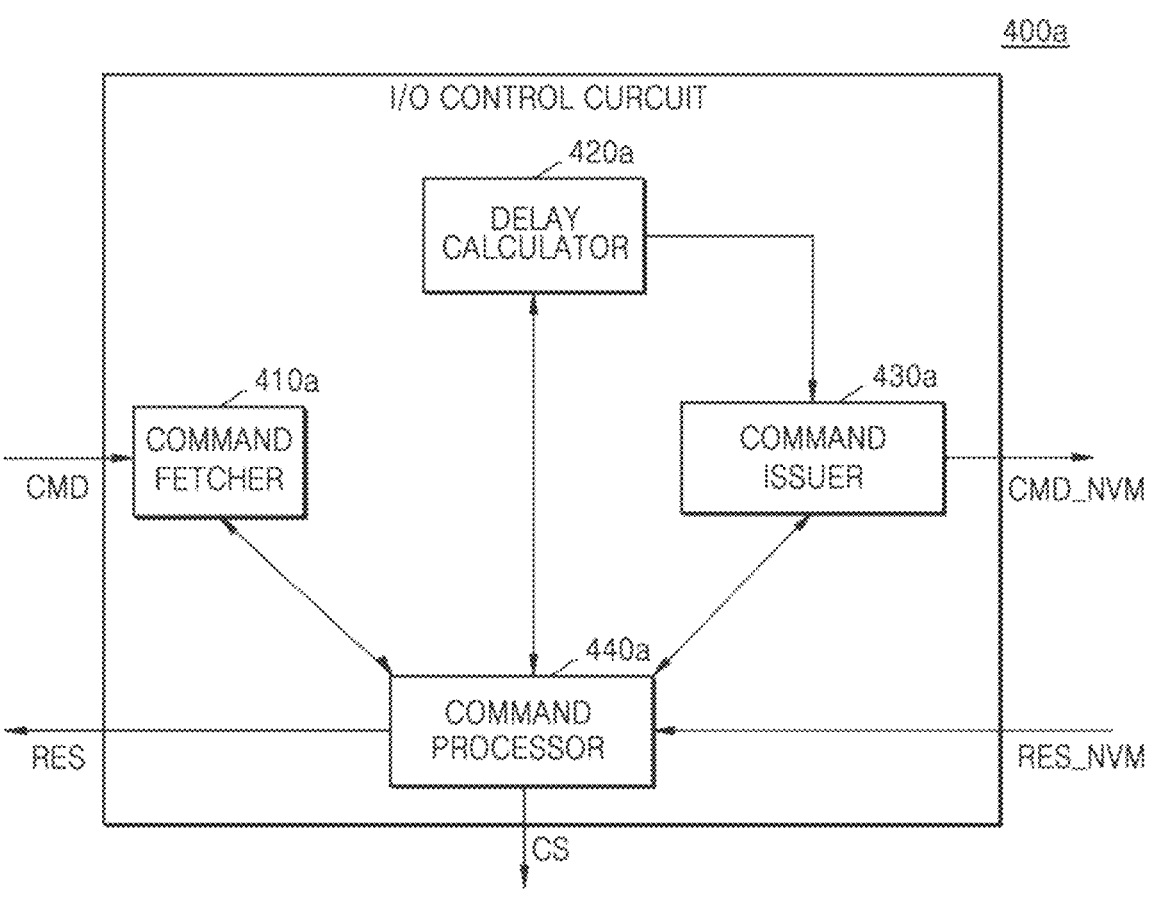
FIGS. 5A through 5C are block diagrams of input/output (I/O) control circuits according to embodiments.
Figure 5B:
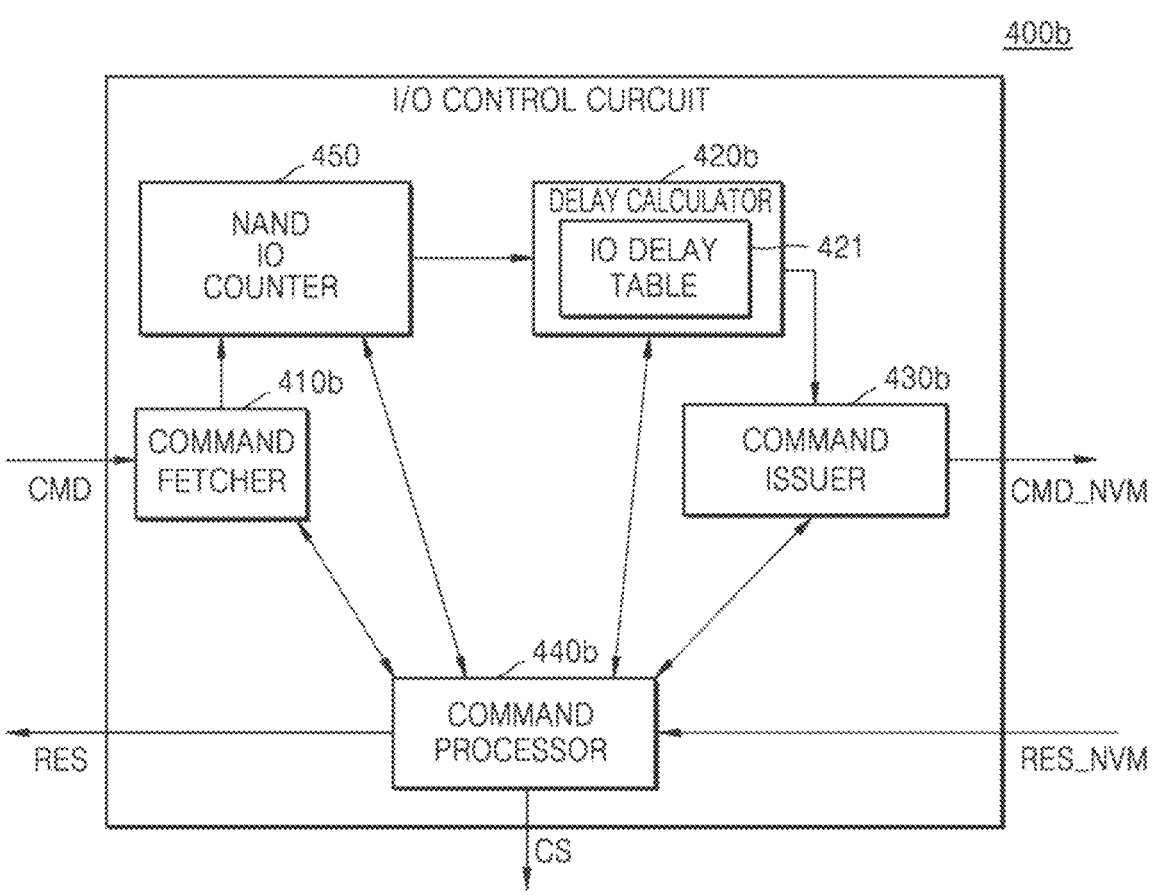
Figure 5C:
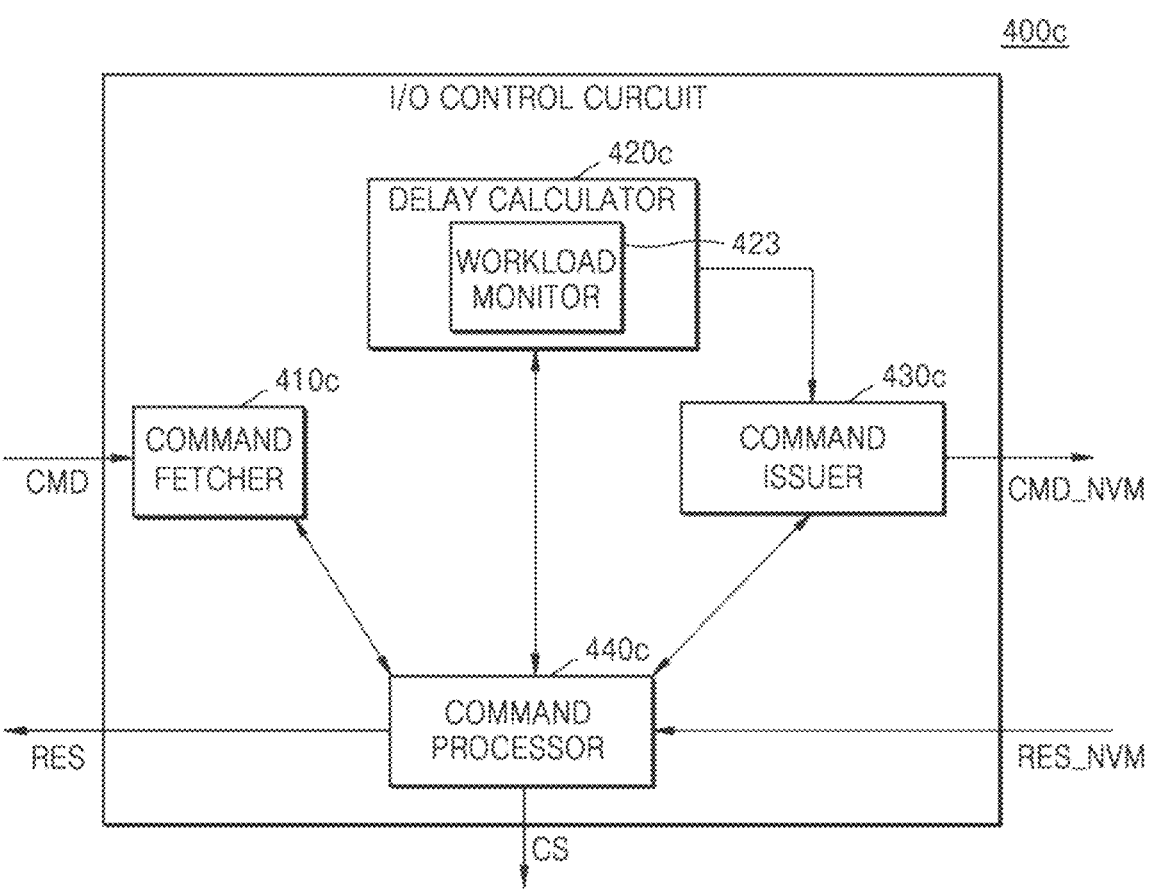

FIG. 5A is a block diagram of the I/O control circuit 400a according to an embodiment. FIG. 5B is a block diagram of the I/O control circuit 400b according to an embodiment. FIG. 5C is a block diagram of the I/O control circuit 400c according to an embodiment. The I/O control circuits 400a, 400b, and 400c may correspond to the I/O control circuit 113 described with reference to FIGS. 1 through 4, and duplicate descriptions of the I/O control circuit 113 given with reference to FIGS. 1 through 4 are omitted in FIGS. 5A and 5B.

Referring to FIGS. 5A through 5C, the I/O control circuits 400a, 400b, and 400c may include command fetchers 410a, 410b, and 410c, delay calculators 420a, 420b, and 420c, command issuers 430a, 430b, and 430c, a command processors 440a, 440b, and 440c, respectively. As an example, the command fetchers 410a, 410b, and 410c, the delay calculators 420a, 420b, and 420c, the command issuers 430a, 430b, and 430c, and the command processors 440a, 440b, and 440c may be implemented in a form of software, hardware, or a combination thereof. In addition, in some embodiments, the command processors 440a, 440b, and 440c may include the command fetchers 410a, 410b, and 410c, the delay calculators 420a, 420b, and 420c, and the command issuers 430a, 430b, and 430c, respectively.

The command fetchers 410a, 410b, and 410c may receive commands from the host 200. In addition, the command fetchers 410a, 410b, and 410c may provide commands received from the host 200 to the command processors 440a, 440b, and 440c, respectively.

The delay calculators 420a, 420b, and 420c may calculate output time intervals of command to be issued by the command issuers 430a, 430b, and 430c, and provide the calculated output time intervals to the command issuers 430a, 430b, and 430c, respectively.

In other words, the delay calculators 420a, 420b, and 420c may calculate output delay time for each command, and provide the output delay time for each command to the command issuers 430a, 430b, and 430c, respectively.

The command issuers 430a, 430b, and 430c may generate a command CMD_NVM instructing an operation of a memory device, and provide the command CMD_NVM instructing an operation of the memory device to the memory device. For example, the command CMD_NVM may be a command instructing an operation of each of a plurality of non-volatile memory devices included in a memory device.

In addition, the command issuers 430a, 430b, and 430c may adjust output time intervals of a plurality of commands provided to a memory device based on the output time intervals of commands provided by the delay calculators 420a, 420b, and 420c, respectively.

For example, the command issuers 430a, 430b, and 430c may adjust an output time interval between a first output time point of a first command for a first non-volatile memory device among a plurality of non-volatile memory devices connected to the same channel, and a second output time point of a second command for a second non-volatile memory device among the plurality of non-volatile memory devices.

In other words, the command issuers 430a, 430b, and 430c may delay an output time point of the command CMD_NVM instructing an operation of a memory device based on the output time point of each command provided by the delay calculators 420a, 420b, and 420c, respectively.

For example, the command issuers 430a, 430b, and 430c may adjust an output time interval between the first command instructing an operation of a memory device (e.g., the first non-volatile memory device 130_1) on the first memory bank 133_1, and the second command instructing an operation of a memory device (e.g., the second non-volatile memory device 130_2) on the second memory bank 133_2 connected to the same channel as the first memory bank 133_1. In this manner, an end time point of the DMA operation on the first memory bank 133_1 may be different from a start time point of the DMA operation on the second memory bank 133_2 by a time interval corresponding to the adjusted output time point. In other words, as the DMA interval of the first memory bank 133_1 is apart from the DMA interval of the second memory bank 133_2 by the adjusted output time interval, the DMA interval of the first memory bank 133_1 and the second memory bank 133_2 connected to one channel may be distributed.

The command processors 440a, 440b, and 440c may entirely control operations of the I/O control circuits 400a, 400b, and 400c, respectively.

For example, the command processors 440a, 440b, and 440c may output the control signal CS controlling an operation of the DMA engine 111. In this case, the control signal CS may include first through sixth control signals CS1 through CS6 described with reference to FIGS. 2A through 2D.

In addition, the command processors 440a, 440b, and 440c may provide the response RES of the storage device 100 to the host 200 based on the response RES_NVM of the memory device 130.

In addition, the command processors 440a, 440b, and 440c may be configured to receive the command CMD of the host 200 provided by the command fetchers 410a, 410b, and 410c, and the command issuers 430a, 430b, and 430c may be configured to output the command CMD_NVM instructing an operation of the memory device 130 corresponding to the command CMD of the host 200. For example, the command CMD_NVM may be a command instructing an operation of each of a plurality of non-volatile memory devices included in a memory device.

In addition, the command processors 440a, 440b, and 440c may determine a sequence of commands CMD_NVMs instructing an operation of the memory device 130. The command issuers 430a, 430b, and 430c may be configured to provide the commands CMD_NVMs to the memory device 130 according to the determined sequence.

Referring to FIG. 5A, the delay calculator 420a may provide an output delay time for each command to the command issuer 430a, based on whether the command CMD_NVM is output in response to the command CMD of the host 200, whether the command CMD_NVM is a write command WRITE CMD, or whether the command CMD_NVM is a read command READ CMD.

In other words, the delay calculator 420a may provide the output delay time for each command to the command issuer 430a according to the first through fourth DMA operations of the DMA ENGINE on the memory device 130 described with reference to FIGS. 2A through 2D corresponding to the command CMD_NVM.

In this case, the first DMA operation may indicate provision of data from a buffer memory to a page buffer of a memory device (e.g., one non-volatile memory device) by a DMA engine according to a write request of a host, the second DMA operation may indicate data storage from a page buffer of a memory device (e.g., one non-volatile memory device) to a buffer memory by a DMA engine according to a write request of a host, the third DMA operation may indicate provision of data from a buffer memory to a page buffer of the memory device (e.g., one non-volatile memory device) by a DMA engine according to a write request of a host, and the fourth DMA operation may indicate data storage from a page buffer of a memory device (e.g., one non-volatile memory device) to a buffer memory by a DMA engine according to a write request of a host.

The command issuer 430a may adjust the output time interval between the commands CMD_NVMs instructing an operation of the memory device 130 based on whether the command CMD_NVM is output in response to the command CMD of the host 200.

In this case, when the command CMD_NVM is output in response to the command CMD of the host 200, the DMA engine 111 may perform the first DMA operation or the second DMA operation. When the command CMD_NVM is not output in response to the command CMD of the host 200 (that is, when an internal operation of the storage device 100 is performed), the DMA engine may perform the third DMA operation or the fourth DMA operation.

For example, the command issuer 430a may adjust the output time interval between the first command instructing an operation of a memory device (e.g., the first non-volatile memory device) on the MEMORY BANK11 based on whether the command CMD_NVM is output in response to the command CMD of the host 200, and the second command instructing an operation of a memory device (e.g., the second non-volatile memory device) on the second memory bank connected to the same channel as the first memory bank.

When the second command is output in response to the command CMD of the host 200, the command issuer 430a may adjust the output time interval as a first time interval, and when the second command is output for an internal operation of the storage device 100, the command issuer 430a may adjust the output time interval as a second time interval less than the first time interval.

To satisfy the QoS requirements, the output delay time of a command output in response to the command CMD of the host 200 may be less than the command output for the internal operation.

In addition, the command issuer 430a may adjust the output time interval between the commands CMD_NVMs instructing an operation of the memory device 130 based on whether the command CMD_NVM is a WRITE COMMAND or a read command READ CMD.

In this case, when the command CMD_NVM is a write command WRITE CMD, the DMA engine 111 may perform the first DMA operation or the third DMA operation. When the command CMD_NVM is a read command READ CMD, the DMA engine 111 may perform the second DMA operation or the fourth DMA operation.

For example, the command issuer 430a may adjust the output time interval between the first command instructing an operation of a memory device (e.g., the first non-volatile memory device) on the MEMORY BANK11 based on whether the command CMD_NVM is a write command WRITE CMD or a read command READ CMD, and the second command instructing an operation of a memory device (e.g., the second non-volatile memory device) on the second memory bank connected to the same channel as the first memory bank.

When the second command is a Write command WRITE CMD, the command issuer 430a may adjust the output time interval as a third time interval, and when the second command is a read command READ CMD, the command issuer 430a may adjust the output time interval as the second time interval less than the first time interval.

To satisfy the QoS requirements, the output delay time of a Read command READ CMD may be less than the output delay time of a write command WRITE CMD.

Referring to FIG. 5B, the I/O control circuit 400b may further include an IO delay table 421 I/O and a NAND IO counter 450. According to an embodiment, a delay calculator 420b may include an IO delay table 421.

The NAND IO counter 450 may provide the number of commands to be processed by the I/O control circuit 400b to the delay calculator 420b. In other words, the NAND IO counter 450 may provide the number of un-processed commands or stand-by commands to the delay calculator 420b.

In this case, the NAND IO counter 450 may receive a fetched command from a command fetcher 410b. The NAND IO counter 450 may accumulate and store the fetched commands, and determine the number of commands to be processed via communication with a command processor 440b.

The delay calculator 420b may provide the output delay time for each command to a command issuer 430b based on the number of un-processed commands or stand-by commands.

The delay calculator 420b may include the IO delay table 421. The IO delay table 421 may be implemented as a look-up table, and may store information about the output delay times of command for each un-processed command or each stand-by command. The delay calculator 420b may determine the output delay times according to the number of un-processed commands or stand-by commands by using the IO delay table 421.

The delay calculator 420b may provide the output delay time according to the number of stand-by commands to the command issuer 430b while outputting the command CMD_NVM.

In other words, the command issuer 430b may adjust the output time interval between the commands CMD_NVMs instructing an operation of the memory device 130 based on the number of stand-by commands while outputting the command CMD_NVM.

For example, the command issuer 430b may adjust the output time interval between the first command instructing an operation of a memory device (e.g., first non-volatile memory device) on the first memory bank based on the number of stand-by commands while outputting the command CMD_NVM, and the second command instructing an operation of a memory device (e.g., the second non-volatile memory device) on the second memory bank connected to the same channel as the first memory bank. In this case, the number of stand-by commands while outputting the command CMD_NVM may indicate the number of the stand-by commands while the second command is output.

The command issuer 430b may adjust the output time interval longer as the number of stand-by commands increases while the command CMD_NVM is output.

For example, referring to FIG. 6, while the number of stand-by commands NAND IO count increases from zero to four, the output delay time of a command may increase from about 0 µs to about 40 µs.

Figure 7A:
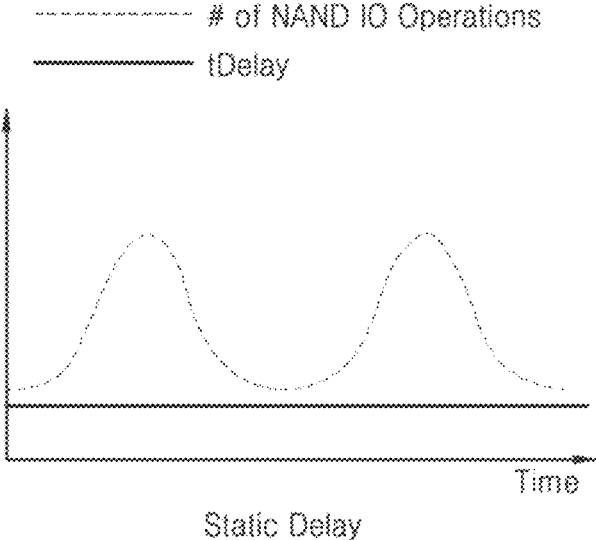
FIGS. 7A and 7B are diagrams of operating methods of a storage device according to embodiment.
Figure 7B:
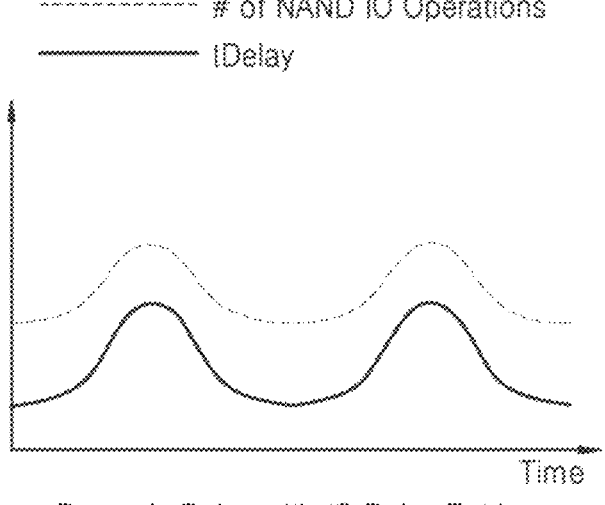

In addition, referring to FIGS. 7A and 7B, FIG. 7A is a diagram, in which an output delay time tDelay of a command is constant with respect to the number of stand-by commands NAND IO count, and FIG. 7B is a diagram in which the output delay time tDelay of a command varies dynamically with respect to the number of stand-by commands NAND IO count.

A difference between a maximum value and a minimum value of the number of stand-by commands NAND IO count in FIG. 7B may be less than a difference between a maximum value and a minimum value of the number of stand-by commands NAND IO count in FIG. 7A, and accordingly, it may be understood that the Write/Read QoS has been improved.

Referring back to FIG. 5C again, an I/O control circuit 400c may further include a workload monitor 423. In some embodiments, a delay calculator 420c may include the workload monitor 423.

The workload monitor 423 may monitor information indicating workload of the storage device 100. For example, the workload monitor 423 may perform an operation of monitoring information indicating the workload of the storage device 100 in a software method or a hardware method, or may also perform the operation based on a combination of software and hardware methods.

For example, information indicating the workload of the storage device 100 may include a host read bandwidth, a host write bandwidth, an internal read bandwidth, an internal write bandwidth, power consumption, a write amplification factor (WAF), a DMA operation time (tDMA), write time (tWrite) in the memory device 130, read time tRead in the memory device 130, etc. In other words, information indicating the workload of the storage device 100 may be a factor affecting performance of the storage device 100.

In addition, the workload monitor 423 may monitor information indicating the workload of the storage device 100 in command units.

In other words, the workload monitor 423 may monitor information indicating workload of the storage device 100 according to execution of a command.

In addition, the workload monitor 423 may provide a monitoring result in command units to the delay calculator 420c.

The delay calculator 420c may provide the output delay time for each command based on the monitoring result in command units to the command issuer 430c.

As an example, the delay calculator 420c may determine a maximum output delay time of the command CMD_NVM based on the DMA operation time tDMA performed in one memory bank and the write time (tWrite) in the memory device 130.

For example, the delay calculator 420c may determine the maximum output delay time of the command CMD_NVM according to Formula 1.

$$\text{Max } tDelay = \frac{tWrite + tDMA}{\text{Bank per Channel}} \qquad \text{[Formula 1]}$$

In this case, Max tDelay may indicate the maximum output delay time of the command CMD_NVM, tWrite may indicate time required for writing data copied in a page buffer into one memory bank by a memory device, tDMA may indicate time required for copying data from a buffer memory to a page buffer corresponding to one memory bank by a DMA engine, and a Bank per Channel may indicate the number of memory banks connected to each channel.

The delay calculator 420c may provide the output delay time within the determined maximum output delay time to the command issuer 430c.

The command issuer 430c may adjust the output time interval between commands CMD_NVMs instructing an operation of a memory device based on the DMA operation time tDMA performed in one memory bank and the write time (tWrite) in a memory device.

As an example, the command issuer 430c may output the command CMD_NVM having an arbitrary delay output time within the maximum output delay time according to Formula 1.

As another example, the delay calculator 420c may determine the maximum output delay time of the command CMD_NVM based on the host read bandwidth or the host write bandwidth.

For example, when the present host read bandwidth is about 230 MiB/s, because a programmed data size per one program operation is about 256 KiB/s, the maximum output delay time may be calculated as about 256 KiB/(about 230 MiB/s)=about 1 ms.

In other words, the delay calculator 420c may determine the maximum output delay time of the command CMD_NVM based on the host read bandwidth and the programmed data size per one program operation.

For example, the command issuer 430c may the command CMD_NVM having an arbitrary delay output time in the maximum output delay time determined according to the host read bandwidth and the programmed data size for one program operation.

Figure 8:
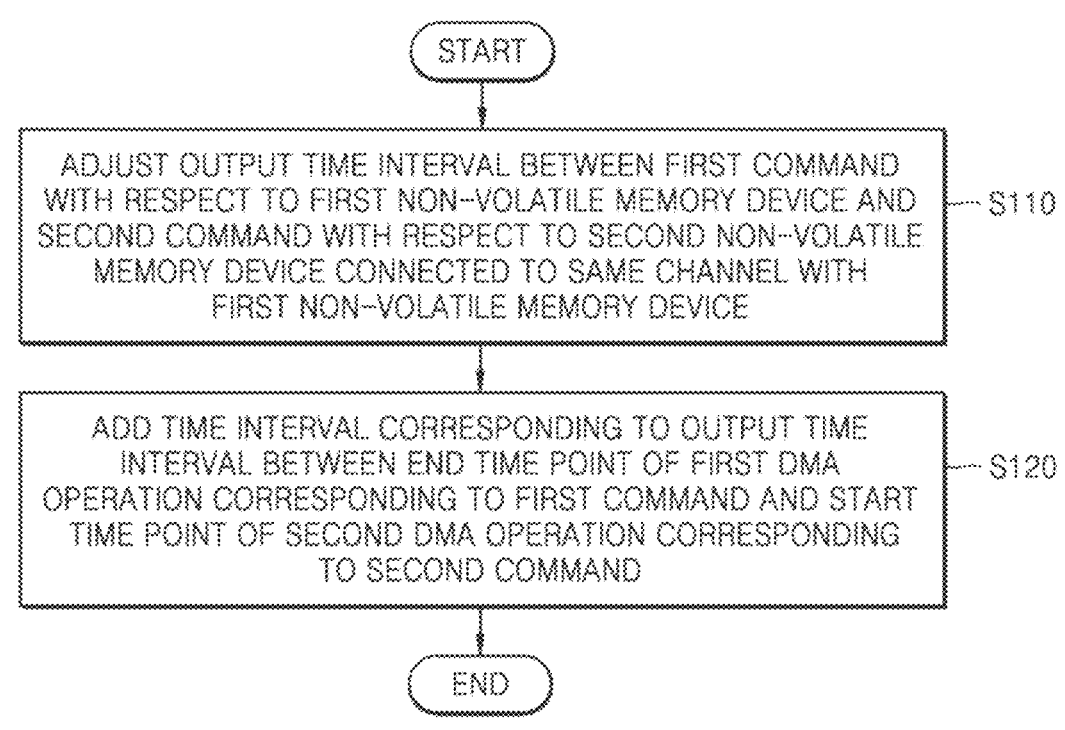
FIG. 8 is a flowchart of an operation of a storage device according to an embodiment.

FIG. 8 is a flowchart of an operation of the storage device 100 according to an embodiment. FIG. 8 may be described later with reference to FIG. 4A.

The storage device 100 (e.g., the memory controller 110) may adjust an output time interval between a first output time point of a first command for a first non-volatile memory device among a plurality of non-volatile memory devices connected to the same channel, and a second output time point of a second command for a second non-volatile memory device among the plurality of non-volatile memory devices connected to the same channel (operation S110).

The storage device 100 (e.g., the memory controller 110) may add a time interval corresponding to the output time interval adjusted between an end time point of the first DMA operation corresponding to a first command of the DMA engine 111 and a start time point of the second DMA operation corresponding to a second command of the DMA engine 111 (operation S120).

As an example, the storage device 100 may adjust the output time interval based on the number of stand-by commands in the memory controller 110. For example, the storage device 100 may increase the output time interval as the number of stand-by commands in the memory controller 110 increases.

As an example, the storage device 100 may adjust the output time interval based on whether a second command is output in response to a command of a host. For example, when the second command is output in response to a command of a host, the storage device 100 may adjust the output time interval as a first time interval, and when the second command is output for an internal operation of the storage device 100, the storage device 100 may adjust the output time interval as a second time interval less than the first time interval.

As an example, the storage device 100 may adjust the output time interval based on whether the second command is a write command or a read command. For example, when the second command is a write command, the storage device 100 may adjust the output time interval as a third time interval, and when the second command is a read command, the storage device 100 may adjust the output time interval as a fourth time interval less than the third time interval. That is, the storage device 100 may set the output time interval for the write command to be longer than the output time interval for the read command.

As an example, the storage device 100 may determine the maximum output delay time of a command based on the DMA operation time tDMA performed in one memory bank and the write time tWrite in a memory device, and adjust the output time interval as an arbitrary delay output time within the maximum output delay time.

As an example, the storage device 100 may determine the maximum output delay time of a command based on the host read bandwidth and the programmed data size for one program operation, and may adjust the output time interval as an arbitrary delay output time within the maximum output delay time.

As an example, while the first data stored in the buffer memory 120 is provided to the first page buffer 131_1 of the first non-volatile memory device 130_1 corresponding to the first memory bank 133_1, the storage device 100 may not provide the second data stored in the buffer memory 120 to the second page buffer 131_2 of the second non-volatile memory device 130_2 corresponding to the second memory bank 133_2. That is, the storage device 100 may hold off transferring the second data from the buffer memory 120 to the second page buffer 131_2 while the first data is transferred from the butter memory 120 to the first page buffer 131_1.

Figure 9:
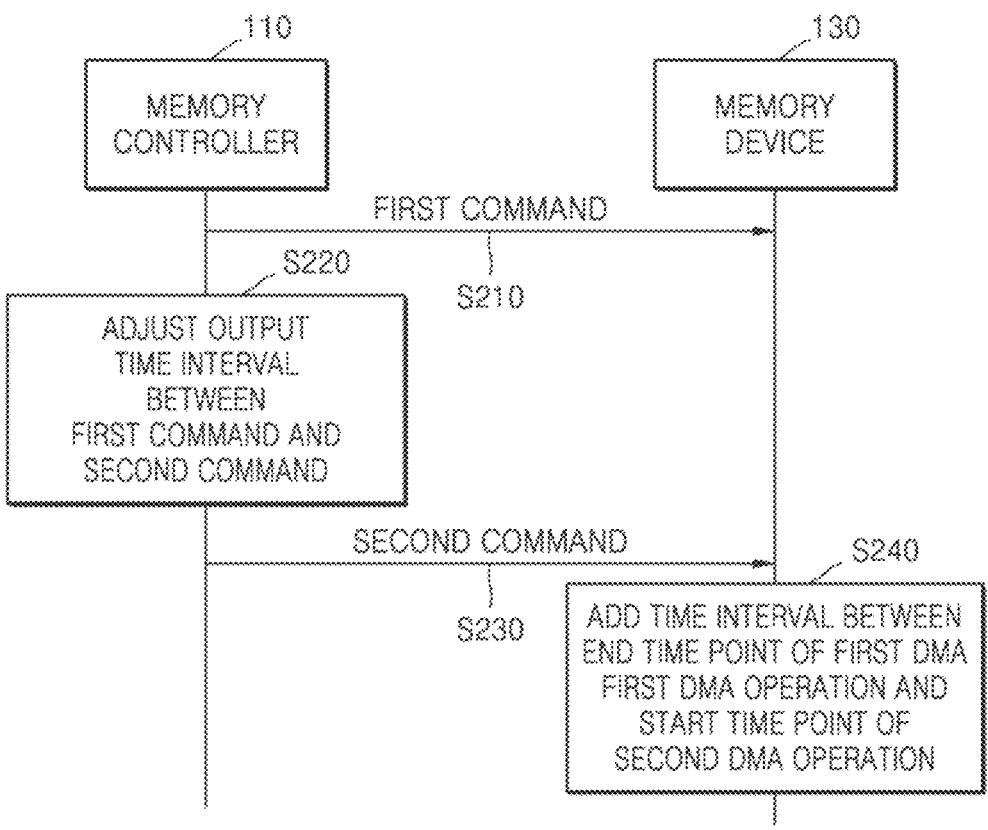
FIG. 9 is a diagram illustrating an operating method of a memory controller and a memory device according to a flow of time, according to an embodiment.

FIG. 9 is a diagram of an operating method of the memory controller 110 and the memory device 130 according to a flow of time, according to an embodiment. FIG. 9 may be described with reference to FIGS. 1 through 8, and duplicate descriptions thereof may be omitted.

Referring to FIG. 9, in operation S210, the memory controller 110 may transfer the first command for the first non-volatile memory device 130_1 among a plurality of non-volatile memory devices connected to the same channel to the memory device 130. In this case, a first DMA operation may be performed on the first non-volatile memory device 130_1 by the DMA engine 111.

In operation S220, the memory controller 110 may adjust the output time interval between the first command and the second command. In this case, the second command may be a command for the second non-volatile memory device 130_2 connected to the same channel as the first non-volatile memory device 130_1. The memory controller 110 may adjust the output time interval between the first command and the second command according to various embodiments described with reference to FIGS. 5A through 5C.

In operation S230, the memory controller 110 may transfer the second command having a delayed output time to the memory device 130. In this case, a second DMA operation may be performed on the second non-volatile memory device 130_2 by the DMA engine 111.

In operation S240, between the end time point of the first DMA operation on the first memory bank 133_1 corresponding to the first non-volatile memory device 130_1 of the memory device 130 and the start time point of the second DMA operation on the second memory bank 133_2 corresponding to the second non-volatile memory device 130_2, a time interval corresponding to the output time interval may be added.

According the embodiments of the disclosure, by distributing the DMA interval with respect to a plurality of memory banks connected to one channel by adjusting an output time interval between commands each instructing an operation of each of the plurality of memory banks connected to one channel, a delay time occurring in the process of a new host read command may be reduced.

In addition, according to the embodiments, by reducing a delay time occurring in the process of the new host read command, quality of service (QOS) requirements may be satisfied.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A storage device comprising:
a memory controller;
a buffer memory; and
a memory device comprising a plurality of non-volatile memory devices connected to the memory controller via an identical channel, wherein each of the plurality of non-volatile memory devices comprises a memory bank and a page buffer,
wherein the memory controller comprises a direct memory access (DMA) engine configured to perform a DMA operation of transferring data from the buffer memory to the plurality of non-volatile memory devices or transferring data from the plurality of non-volatile memory devices to the buffer memory, and
wherein the memory controller is configured to:
generate a first command for performing a first DMA operation and a second command for performing a second DMA operation;
adjust an output time interval between a first output time point of the first command with respect to a first non-volatile memory device among the plurality of non-volatile memory devices and a second output time point of the second command with respect to a second non-volatile memory device among the plurality of non-volatile memory devices, and
add a time interval corresponding to the output time interval between an end time point of the first DMA operation corresponding to the first command and a start time point of the second DMA operation corresponding to the second command.

2. The storage device of claim 1, wherein the memory controller is further configured to adjust the output time interval based on a number of stand-by commands in the memory controller.

3. The storage device of claim 2, wherein the memory controller is further configured to increases the output time interval as the number of stand-by commands in the memory controller increases.

4. The storage device of claim 1, wherein the memory controller is further configured to adjust the output time interval based on whether the second command is output in response to a command of a host.

5. The storage device of claim 4, wherein,
when the second command is output in response to the command of the host, the memory controller is further configured to adjust the output time interval as a first time interval, and
when the second command is output for an internal operation of the storage device, the memory controller is further configured to adjust the output time interval as a second time interval less than the first time interval.

6. The storage device of claim 1, wherein the memory controller is further configured to adjust the output time interval based on whether the second command is a write command or a read command.

7. The storage device of claim 6, wherein,
when the second command is the write command, the memory controller is further configured to adjust the output time interval as a third time interval, and
when the second command is the read command, the memory controller is further configured to adjust the output time interval as a fourth time interval less than the third time interval.

8. The storage device of claim 1, wherein,
while first data is transferred from the buffer memory to the first non-volatile memory device, the DMA engine is further configured to hold off transferring second data from the buffer memory to the second non-volatile memory device.

9. An operating method of a storage device comprising a plurality of non-volatile memory devices, the operating method comprising:
generating a first command for performing a first DMA operation and a second command for performing a second DMA operation;
adjusting an output time interval between a first output time point of the first command with respect to a first non-volatile memory device among the plurality of non-volatile memory devices connected to an identical channel and a second output time point of the second command with respect to a second non-volatile memory device among the plurality of non-volatile memory devices; and
adding a time interval corresponding to the output time interval, between an end time point of the first DMA operation corresponding to the first command and a start time point of the second DMA operation corresponding to the second command.

10. The operating method of claim 9, wherein the adjusting of the output time interval comprises adjusting the output time interval based on a number of stand-by commands in a memory controller.

11. The operating method of claim 10, wherein the adjusting of the output time interval comprises increasing the output time interval as the number of stand-by commands in the memory controller increases.

12. The operating method of claim 9, wherein the adjusting of the output time interval comprises adjusting the output time interval based on whether the second command is output in response to a command of a host.

13. The operating method of claim 12, wherein the adjusting of the output time interval comprises:

when the second command is output in response to the command of the host, adjusting the output time interval as a first time interval; and when the second command is output for an internal operation of the storage device, adjusting the output time interval as a second time interval less than the first time interval.

14. The operating method of claim 9, wherein the adjusting of the output time interval comprises adjusting the output time interval differently based on whether the second command is a write command or a read command.

15. The operating method of claim 14, wherein the adjusting of the output time interval comprises:

when the second command is the write command, adjusting the output time interval as a third time interval; and when the second command is the read command, adjusting the output time interval as a fourth time interval less than the third time interval.

16. The operating method of claim 9, wherein the adding of the time interval comprises, while first data is transferred from a buffer memory to the first non-volatile memory device, holding off transferring second data from the buffer memory to the second non-volatile memory device.

17. A computing system comprising:

a host; and a storage device configured to store data according to a control by the host, wherein the storage device comprises:

a memory controller;

a buffer memory; and a memory device comprising a plurality of non-volatile memory devices connected to the memory controller via an identical channel, wherein each of the plurality of non-volatile memory devices comprises a memory bank and a page buffer, wherein the memory controller comprises a direct memory access (DMA) engine configured to perform a DMA operation of transferring data from the buffer memory to the plurality of non-volatile memory devices or transferring data from the plurality of non-volatile memory devices to the buffer memory, and wherein the memory controller is further configured to:

generate a first command for performing a first DMA operation and a second command for performing a second DMA operation;

adjust an output time interval between a first output time point of the first command with respect to a first non-volatile memory device among the plurality of non-volatile memory devices and a second output time point of the second command with respect to a second non-volatile memory device among the plurality of non-volatile memory devices, and add a time interval corresponding to the output time interval between an end time point of the first DMA operation corresponding to the first command and a start time point of the second DMA operation corresponding to the second command.

18. The computing system of claim 17, wherein the memory controller is further configured to adjust the output time interval based on a number of stand-by commands in the memory controller.

19. The computing system of claim 17, wherein the memory controller is further configured to adjust the output time interval based on whether the second command is output in response to a command of the host.

20. The computing system of claim 17, wherein the memory controller is further configured to adjust the output time interval differently based on whether the second command is a write command or a read command.

* * * * *